(12) United States Patent
Sharp

(10) Patent No.: US 7,526,434 B2
(45) Date of Patent: Apr. 28, 2009

(54) NETWORK BASED SYSTEM AND METHOD FOR MARKETING MANAGEMENT

(76) Inventor: Linda Sharp, 2090 Green St., #31, San Francisco, CA (US) 94123

( * ) Notice: Subject to any disclaimer, the term of this patent is extended or adjusted under 35 U.S.C. 154(b) by 935 days.

(21) Appl. No.: 10/066,148

(22) Filed: Jan. 30, 2002

(65) Prior Publication Data

US 2002/0161764 A1    Oct. 31, 2002

Related U.S. Application Data

(60) Provisional application No. 60/265,019, filed on Jan. 30, 2001.

(51) Int. Cl.
*G06F 17/30* (2006.01)
(52) U.S. Cl. ...................................................... 705/10
(58) Field of Classification Search .................... 705/10
See application file for complete search history.

(56) References Cited

U.S. PATENT DOCUMENTS

| | | | |
|---|---|---|---|
| 4,908,761 A | 3/1990 | Tai | |
| 5,644,723 A | 7/1997 | Deaton et al. | |
| 5,930,764 A | 7/1999 | Melchione et al. | |
| 6,236,975 B1 * | 5/2001 | Boe et al. | 705/7 |
| 6,334,110 B1 * | 12/2001 | Walter et al. | 705/14 |
| 6,453,347 B1 | 9/2002 | Revashetti et al. | |
| 6,567,786 B1 * | 5/2003 | Bibelnieks et al. | 705/14 |
| 6,622,126 B1 * | 9/2003 | McArdle et al. | 705/26 |
| 6,865,578 B2 | 3/2005 | Hays | |
| 7,069,231 B1 | 6/2006 | Cinarkaya et al. | |
| 7,152,039 B1 * | 12/2006 | Cheng et al. | 705/10 |
| 7,158,943 B2 | 1/2007 | van der Riet | |
| 7,197,508 B1 | 3/2007 | Brown, III | |
| 7,216,087 B2 * | 5/2007 | Thompson et al. | 705/10 |
| 2002/0059283 A1 * | 5/2002 | Shapiro et al. | 707/100 |
| 2002/0161779 A1 | 10/2002 | Brierley et al. | |

OTHER PUBLICATIONS

Sharp, Linda. Fung, Mei Lin. "Marketing Math(TM): An Analytical Framework for the Art of Marketing". 1998. accessed at <http://www.malch.com/arshiya/a-items/mei-lin-fung.html>.*

Mulhern, Francis J. "Customer Profitability Analysis: Measurement, Concentration and Research Directions". 1999. Journal of Interactive Marketing. vol. 13, No. 1. pp. 25-40.*

(Continued)

*Primary Examiner*—Jonathan G. Sterrett
*Assistant Examiner*—Peter H. Choi
(74) *Attorney, Agent, or Firm*—Armstrong Teasdale LLP

(57) ABSTRACT

A marketing management method and a system to manage interactions, develop base line for the current performance, analyzing various marketing strategies and selecting a desirable marketing strategy for implementation are disclosed. In one embodiment of the invention, the method helps clients prepare product and service brands to mitigate risks and maximize profits. The method utilizes a web-based system including a server system coupled to a centralized interactive database and at least one client system. The method further includes the steps of documenting benefits and leading indicator metrics to evaluate an impact of the new marketing strategy and then making iterative improvements after strategy implementation to the new marketing strategy to refine the marketing strategy further to reduce risks and increase profits.

13 Claims, 62 Drawing Sheets

OTHER PUBLICATIONS

Kish, John. "Before Your Customers Leave . . . ". Dec. 2000. Bank Marketing. vol. 32, Issue 12. pp. 30-35.*

Kelly, Thomas H. "Maximizing Lifetime Customer Value". Nov./Dec. 2000, LIMRA'S MarketFacts. vol. 19, Issue 6. pp. 30-36.*

Pickering, Mark. "Not All Customers Are Created Equal". Oct. 1999. Charter. vol. 70, Issue 9. pp. 3840.*

Bulger, David W. "The Evolution of Relationship Marketing: Reaching an Audience of One". Apr. 1999. Direct Marketing. vol. 61, Issue 12. pp. 54-59.*

Koslowsky, Sam. "Reducing Your Risk: WHat's Happening In Retail Database Marketing". Jan. 1999. Direct Marketing. vol. 61, Issue 9. pp. 40-43.*

Berger, Paul D., Nasr, Nada I. "Customer Lifetime Value: Marketing Models and Applications". 1998. JOurnal of Interactive Marketing. vol. 12, Issue 1. pp. 17-30.*

Dwyer, F. Robert. "Customer Lifetime Valuation to Support Marketing Decision Making". 1997. Journal of Direct Marketing. vol. 11, Issue 4. pp. 6-13.*

* cited by examiner

N-Tier Architecture Overview

Tactics Grid

| Promotional/Relationship Enhancement Tactics | Phases | | |
|---|---|---|---|
| | Acquisition | Closing | Retention |
| Advertising | X | | |
| Promo. Direct Mail | X | | |
| Telemarketing | X | | |
| Sales Promotion | X | X | |
| Seminars/Conferences | X | X | X |
| Trade Shows | X | X | X |
| Special Events | X | X | X |
| Presentations | | X | |
| Sales Materials | | X | |
| Status Reports | | X | X |
| Documentation | X | X | X |
| Training | | | X |
| Technical Support | | | X |
| Company Literature | X | X | X |
| Newsletters | X | X | X |
| Web Site | X | X | X |
| Public Relations (PR) | X | X | X |
| Ongoing Telemarketing | X | X | X |
| Ongoing Direct Mail | X | X | |
| Ongoing PR | X | X | X |
| Email Campaigns | X | X | X |
| Ongoing Thank Yous | X | X | X |
| Web Newsletter | X | X | X |
| Web Advertising | X | | |
| Web Sponsorships | X | | X |
| Web PR | X | X | X |
| Community | X | X | X |
| Ecommerce | X | X | X |
| Sponsorships | X | X | X |
| Strategic Alliances | X | X | X |
| Viral Marketing | X | X | X |
| Affinity Marketing | X | X | X |
| Coop Advertising | X | | |
| Cross Selling Programs | | X | X |
| Recognition Programs | | | X |
| Charitable Contributions | | | X |

| Personal Interaction Tactics | Acquisition | Closing | Retention |
|---|---|---|---|
| Custom Communication | X | X | X |
| Custom Interaction | | X | X |
| Personal Touch | X | X | X |
| Extraordinary Events | X | X | X |

FIG. 13

Relative Interaction Value (RIV) Number Grid 370

| Promotional/Relationship Enhancement Tactics | Phases | | |
|---|---|---|---|
| | Acquisition RE+ Impt=RIV# | Closing RE+ Impt=RIV# | Retention RE+ Impt=RIV# |
| Advertising | .000+.010=.010 | | |
| Promo. Direct Mail | .010+.020=.030 | | |
| Telemarketing | .030+.010=.040 | | |
| Sales Promotion | .030+.030=.060 | .030+.070=.100 | |
| Seminars/Conferences | .050+.020=.070 | .010+.030=.040 | .020+.050=.070 |
| Trade Shows | .010+.010=.020 | .010+.020=.030 | .010+.030=.040 |
| Special Events | .080+.060=.140 | .080+.060=.140 | .090+.080=.170 |
| Presentations | | .050+.050=.100 | |
| Sales Materials | | .000+.040=.040 | |
| Status Reports | | .070+.080=.150 | .090+.010=.180 |
| Documentation | .000+.010=.010 | .000+.060=.060 | .010+.070=.080 |
| Training | | | .050+.070=.120 |
| Technical Support | | | .080+.080=.160 |
| Company Literature | .000+.010=.010 | .000+.010=.010 | .000+.020=.020 |
| Newsletters | .000+.010=.010 | .000+.010=.010 | .070+.040=.110 |
| Web Site | .030+.030=.060 | .040+.040=.080 | .060+.060=.120 |
| Public Relations (PR) | .000+.050=.050 | .000+.030=.030 | .000+.040=.040 |
| Ongoing Telemarketing | .060+.020=.080 | .020+.010=.030 | .010+.020=.030 |
| Ongoing Direct Mail | .010+.030=.040 | .010+.010=.020 | |
| Ongoing PR | .000+.030=.030 | .000+.010=.010 | .000+.020=.020 |
| Email Campaigns | .020+.020=.040 | .020+.040=.060 | .020+.040=.060 |
| Ongoing Thank Yous | .100+.080=.180 | .100+.080=.180 | .100+.090=.190 |
| Web Newsletter | .010+.010=.020 | .010+.010=.020 | .080+.040=.120 |
| Web Advertising | .010+.010=.020 | | |
| Web Sponsorships | .010+.020=.030 | | .010+.020=.030 |
| Web PR | .000+.020=.020 | .000+.010=.010 | .000+.020=.020 |
| Community | .050+.050=.100 | .060+.060=.120 | .070+.070=.140 |
| Ecommerce | .030+.050=.080 | .050+.050=.100 | .030+.040=.070 |
| Sponsorships | .030+.030=.060 | .030+.040=.070 | .030+.030=.060 |
| Strategic Alliances | .030+.030=.060 | .030+.040=.070 | .030+.030=.060 |
| Viral Marketing | .050+.050=.100 | .060+.060=.120 | .050+.050=.100 |
| Affinity Marketing | .050+.040=.090 | .030+.060=.090 | .050+.040=.090 |
| Coop Advertising | .010+.030=.040 | | |
| Cross Selling Programs | | .060+.040=.100 | .100+.080=.180 |
| Recognition Programs | | | .100+.100=.200 |
| Charitable Contributions | | | .080+.050=.130 |

| Personal Interaction Tactics | Acquisition | Closing | Retention |
|---|---|---|---|
| Custom Communication | .060+.060=.120 | .080+.070=.150 | .070+.080=.150 |
| Custom Interaction | | .080+.070=.150 | .070+.080=.150 |
| Personal Touch | .100+.080=.180 | .100+.080=.180 | .100+.090=.190 |
| Extraordinary Events | TBD | TBD | TBD |

FIG. 14

ACCESS
S T R✦T I X™
Relationship
Tracking
System
© 2001 STRATIX™
Patent Pending
Login Name: _____
Password: _____
 ~394
 ~396
392
FIG. 16

PRIORITY ACTION

410 Interaction
412 Priority Action
414 Search Contact
416 Add Contact
418 Add Relationship Planned Interactions ⌒402

| Go To | Interaction Date | Interaction | Contact | Company | Phone | CEL# |
|---|---|---|---|---|---|---|
| ▲ | 02-17-01 | A2-2 Attempt Call | Mary Meu | Lily Corporation | 800-123-4567 | 1.180 |
| ▲ | 02-17-01 | A2-7 Ongoing Thank Yous | N.T. Palm | FishTail Company | 888-321-7654 | 4.000 |

Past Due Interactions — 404

| Go To | Interaction Date | Interaction | Contact | Company | Phone | CEL# |
|---|---|---|---|---|---|---|
| ▲ | 01-31-01 | A2-2 Attempt Call | Percy Resque | Floraluv | 800-109-8765 | 2.040 |

420 Reports
422 Utility

S T R A T I X™
Relationship
Tracking
System

© 2001 STRATIX™
Patent Pending

N.T. Palm
CTO
888-321-7654
ntpalm@fishtail.com
x_ Email Permission

FishTail Company
One Green Street
Suite 17
San Francisco CA 94123
CEL# 4.000

INTERACTION

- Interaction
- Priority Action
- Search Contact
- Add Contact
- Add Relationship Select Contact Information | Select Profiling Questions | Select Knowledge Screening Choose From ▼ | Choose From ▼ | Choose From ▼

Planned Interaction

| Date | Interaction |
|---|---|
| 02-17-01 | A2-7 Ongoing Thank Yous |

- Reports
- Utility

Current Interaction

| User | Date | Interaction | Response |
|---|---|---|---|
|  |  | Choose From ▼ | Choose From ▼ |

| Notes |
|---|
|  |

S T RA T I X™
Relationship
Tracking
System

© 2001 STRATIX™
Patent Pending

| Next Interaction Date | Next Interaction |
|---|---|
|  | Choose From ▼ |

Interaction Record

FIG. 18

| User Edit | Date | Interaction | Response | CEL# | Notes |
|---|---|---|---|---|---|
| LSharp ▼ | 02-16-01 | A2-6 Live Conversation | A2-6dd Hand Off In Person Appt. | 4.000 | Eager to meet. Will have an hour maximum. No one else in meeting. |
| LSharp ▼ | 02-16-01 | A2-3 Leave Voice Mail #2 | | 2.000 | |
| ▼ | 02-13-01 | A1-5 4th Postcard | | 1.180 | |
| LSharp ▼ | 02-07-01 | A2-1 Leave Voice Mail #1 | | 1.150 | |
| ▼ | 02-07-01 | A1-4 Brochure | | 1.120 | |
| ▼ | 02-01-01 | A1-3 3rd Postcard | | 1.090 | |
| ▼ | 01-24-01 | A1-2 2nd Postcard | | 1.060 | |
| ▼ | 01-18-01 | A1-1 1st Postcard | | 1.030 | |

FIG. 19   ↑ 430

SEARCH CONTACT

Sort Database By

| 1st Search Parameter ▼ | 2nd Search Parameter ▼ | 3rd Search Parameter ▼ |

Select Contact From Sorted Database       Select a Contact ▼

STRATIX™
Relationship
Tracking
System

© 2001 STRATIX™
Patent Pending

| Search Contact By: | | Minimum | Maximum |
|---|---|---|---|
| | CEL# | | |
| | Last Interaction Date | 02-12-01 | 02-16-01 |
| | Planned Interaction Date | 02-25-01 | 03-01-01 |
| | First Name | | |
| | Last Name | | |
| | Company | Plants Unlimited | |

Select Contact From Search-Filtered Database       Select a Contact ▼

Herbert Ficus  
CEO  
800-456-7890  
hficus@plantsunlimited.com  
x_ Email Permission Plants Unlimited  
17 Green Street  
Suite 100  
San Francisco CA 94123  
CEL# 5.475

INTERACTION

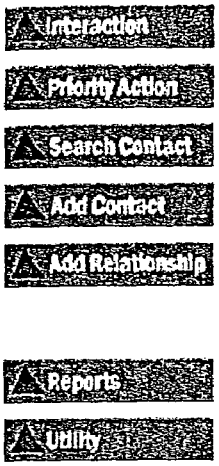

| Select Contact Information | Select Profiling Questions | Select Knowledge Screening |
|---|---|---|
| Choose From ▼ | Choose From ▼ | Choose From ▼ |

Planned Interaction

| Date | Interaction |
|---|---|
| 02-21-01 | C4-7 Follow Up Initial Contract |

Current Interaction

| User | Date | Interaction | Response |
|---|---|---|---|
| | | Choose From ▼ | C4-7a Left Voice Mail ▼ |
| | | C4-7 Follow Up Initial Contract | |
| Notes | | | |

STR⚡TIX™  
Relationship  
Tracking  
System

© 2001 STRATIX™  
Patent Pending

| Next Interaction Date | Next Interaction |
|---|---|
| 02-26-01 | Choose From ▼ |
| | C4-7 Follow Up Initial Contract |

Interaction Record

| User Edit | Date | Interaction | Response | CEL | Notes |
|---|---|---|---|---|---|
| Npatel ▼ | 2/16/01 | C4-4 Thank You For Contract | C4-4a Thank You Note | 5.475 | Will check back 2/21. |
| Npatel ▼ | 2/15/01 | C4-3 Deliver Premium Contract | | 5.355 | Just what Herbert wanted. Will take a couple of weeks to get through Legal. |
| Npatel ▼ | 2/10/01 | C4-1 Set Initial Contract Meeting | | 5.205 | Will only have 30 minutes. |
| Npatel ▼ | 2/5/01 | C3-9 Thank You Follow Up | C3-9b Thank You Email | 5.130 | Thanks for getting answers needed. |
| ▼ | 2/4/01 | A4-1 Monthly Email Tip | | 5.040 | |
| Npatel ▼ | 2/4/01 | C3-8 Follow Up Meeting Initial Proposal | C3-8t WANTS A CONTRACT! | 5.000 | The kicker was our track record and comfort level. |
| Npatel ▼ | 2/1/01 | C3-7 Follow Up Initial Proposal | C3-7I Set Follow Up Meeting | 4.999 | Needs others to agree. |
| Npatel ▼ | 1/25/01 | C3-4 Thank You For Initial Proposal | C3-4a Thank You Note | 4.999 | |
| Npatel ▼ | 1/24/01 | C3-3 Deliver Premium Initial Proposal | | 4.999 | Feels good. |
| Npatel ▼ | | | | | |

FIG. 23  510

| | | | | | |
|---|---|---|---|---|---|
| | 1/20/01 | C3-1 Set Initial Proposal Meeting | | 4.895 | |
| Npatel ▼ | | | | | |
| | 1/15/01 | C2-7 Thank You For Facts | C2-7b Thank You Email | 4.820 | |
| Npatel ▼ | | | | | |
| | 1/14/01 | C2-5 Meeting On Facts | C2-5d Our Facts Have Enough | 4.730 | |
| Npatel ▼ | | | | | |
| | 1/12/01 | C2-4 Set Meeting Confirm Facts | | 4.680 | |
| Npatel ▼ | | | | | |
| | 1/10/01 | C2-3 Premium Fact Finding | | 4.605 | Very cooperative. |
| Npatel ▼ | | | | | |
| | 1/9/01 | C2-1 Follow Up Fact Finding | C2-1i Set Meeting To Get Facts | 4.455 | Doesn't have time to do on own afterall. Wants us to do. |
| Npatel ▼ | | | | | |
| | 1/4/01 | C1-2 Thank You For Appointment | C1-2a Thank You Note | 4.380 | Offered to get facts, if need be. |
| Npatel ▼ | | | | | |
| | 1/3/01 | C1-1 Initial Appointment | C1-1bb Customer To Develop Facts | 4.260 | Wants to do as much as they can, thinks will be faster. |
| Npatel ▼ | | | | | |
| | 1/2/01 | A4-1 Monthly Email Tip | | 4.210 | |
| Npatel ▼ | | | | | |
| | 1/2/01 | C1-1 Initial Appointment | C1-1a Confirm Appointment | 4.170 | |
| Lsharp ▼ | | | | | |
| | 12/21/00 | A2-7 Ongoing Thank Yous | A2-7a Thank You Note | 4.120 | Reminded name of person who will come to see. |
| Lsharp | | | | | |

| | | | | | |
|---|---|---|---|---|---|
| ▼ | 12/21/00 | A2-6 Live Conversation | A2-6dd Hand Off In Person Appt. | 4.000 | Has a go ahead from others. |
| Lsharp ▼ | 12/20/00 | A2-6 Live Conversation | A2-6a Call Back 12/21/00 | 2.080 | Doesn't have feedback yet on email. |
| Lsharp ▼ | 12/19/00 | A2-6 Live Conversation | A2-6d Send Why XYZ Company Email | 2.040 | Wants to send to others. |
| Lsharp ▼ | 12/17/00 | A2-1 Leave Voice Mail #1 | | 1.150 | |
| ▼ | 12/17/00 | A1-4 Brochure | | 1.120 | |
| ▼ | 12/10/00 | A1-3 3rd Postcard | | 1.090 | |
| ▼ | 12/3/00 | A1-2 2nd Postcard | | 1.060 | |
| ▼ | 11/25/00 | A1-1 1st Postcard | | 1.030 | |

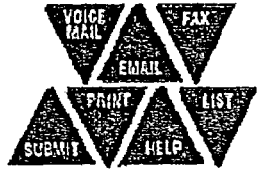

Herbert Ficus  Plants Unlimited
CEO  17 Green Street
800-456-7890  Suite 100
hficus@plantsunlimited.com  San Francisco CA 94123
x_ Email Permission  CEL# 5.535

INTERACTION   Select Contact Information   Select Profiling Questions   Select Knowledge Screening

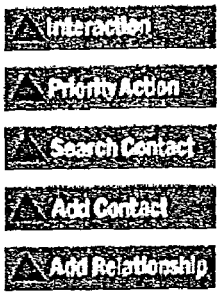

Choose From ▼   Choose From ▼   Choose From ▼

Planned Interaction

| Date | Interaction |
|---|---|
| 02-26-01 | C4-7 Follow Up Initial Contract |

Current Interaction

| User | Date | Interaction | Response |
|---|---|---|---|
| NPatel | 02-26-01 | Choose From ▼<br>C4-7 Follow Up Initial Contract | C4-7a Left Voice Mail ▼<br>C4-7e Signs Contract! |

Notes: Wants Clarence Orchid, his administrative assistant, to meet Customer Care team Friday and start immediately.

S T R A T I X™
Relationship
Tracking
System

© 2001 STRATIX™
Patent Pending

| Next Interaction Date | Next Interaction |
|---|---|
| 02-28-01 | Choose From ▼<br>C4-8 Hand Off To Customer Care |

560

Interaction Record

FIG. 26

| User Edit | Date | Interaction | Response | CEL# | Notes |
|---|---|---|---|---|---|
| Npatel ▼ | 2/21/01 | C4-7 Follow Up Initial Contract | C4-7a Left Voice Mail | 5.535 | |
| Npatel ▼ | 2/16/01 | C4-4 Thank You For Contract | C4-4a Thank You Note | 5.475 | Will check back 2/21. |
| Npatel ▼ | 2/15/01 | C4-3 Deliver Premium Contract | | 5.355 | Just what Herbert wanted. Will take a couple of weeks to get through Legal. |
| Npatel ▼ | 2/10/01 | C4-1 Set Initial Contract Meeting | | 5.205 | Will only have 30 minutes. |
| Npatel ▼ | 2/5/01 | C3-9 Thank You Follow Up | C3-9b Thank You Email | 5.130 | Thanks for getting answers needed. |
| ▼ | 2/4/01 | A4-1 Monthly Email Tip | | 5.040 | |
| Npatel ▼ | 2/4/01 | C3-8 Follow Up Meeting Initial Proposal | C3-8t WANTS A CONTRACT! | 5.000 | The kicker was our track record and comfort level. |
| Npatel ▼ | 2/1/01 | C3-7 Follow Up Initial Proposal | C3-7t Set Follow Up Meeting | 4.999 | Needs others to agree. |
| Npatel ▼ | 1/25/01 | C3-4 Thank You For Initial Proposal | C3-4a Thank You Note | 4.999 | |

| | | | | | |
|---|---|---|---|---|---|
| Npatel ▼ | 1/24/01 | C3-3 Deliver Premium Initial Proposal | | 4.999 | Feels good. |
| Npatel ▼ | 1/20/01 | C3-1 Set Initial Proposal Meeting | | 4.895 | |
| Npatel ▼ | 1/15/01 | C2-7 Thank You For Facts | C2-7b Thank You Email | 4.820 | |
| Npatel ▼ | 1/14/01 | C2-5 Meeting On Facts | C2-5d Our Facts Have Enough | 4.730 | |
| Npatel ▼ | 1/12/01 | C2-4 Set Meeting Confirm Facts | | 4.680 | |
| Npatel ▼ | 1/10/01 | C2-3 Premium Fact Finding | | 4.605 | Very cooperative. |
| Npatel ▼ | 1/9/01 | C2-1 Follow Up Fact Finding | C2-1i Set Meeting To Get Facts | 4.455 | Doesn't have time to do on own afterall. Wants us to do. |
| Npatel ▼ | 1/4/01 | C1-2 Thank You For Appointment | C1-2a Thank You Note | 4.380 | Offered to get facts, if need be. |
| Npatel ▼ | 1/3/01 | C1-1 Initial Appointment | C1-1bb Customer To Develop Facts | 4.260 | Wants to do as much as they can, thinks will be faster. |
| Npatel ▼ | 1/2/01 | A4-1 Monthly Email Tip | | 4.210 | |

| | | | | | |
|---|---|---|---|---|---|
| Npatel ▼ | 1/2/01 | C1-1 Initial Appointment | C1-1a Confirm Appointment | 4.170 | |
| Lsharp ▼ | 12/21/00 | A2-7 Ongoing Thank Yous | A2-7a Thank You Note | 4.120 | Reminded name of person who will come to see. |
| Lsharp ▼ | 12/21/00 | A2-6 Live Conversation | A2-6dd Hand Off In Person Appt. | 4.000 | Has a go ahead from others. |
| Lsharp ▼ | 12/20/00 | A2-6 Live Conversation | A2-6a Call Back 12/21/00 | 2.080 | Doesn't have feedback yet on email. |
| Lsharp ▼ | 12/19/00 | A2-6 Live Conversation | A2-6d Send Why XYZ Company Email | 2.040 | Wants to send to others. |
| Lsharp ▼ | 12/17/00 | A2-1 Leave Voice Mail #1 | | 1.150 | |
| ▼ | 12/17/00 | A1-4 Brochure | | 1.120 | |
| ▼ | 12/10/00 | A1-3 3rd Postcard | | 1.090 | |
| ▼ | 12/3/00 | A1-2 2nd Postcard | | 1.060 | |
| ▼ | 11/25/00 | A1-1 1st Postcard | | 1.030 | |

FIG. 29

Herbert Ficus   Plants Unlimited
CEO             17 Green Street
800-456-7890    Suite 100
hficus@plantsunlimited.com  San Francisco CA 94123
x_ Email Permission  CEL# 6.000

~638

INTERACTION  Select Contact Information | Select Profiling Questions | Select Knowledge Screening Choose From [▼]   Choose From [▼]   Choose From [▼]

- Interaction
- Priority Action
- Search Contact
- Add Contact
- Add Relationship Planned Interaction — 622

| Date | Interaction |
|---|---|
| 02-28-01 | C4-8 Hand Off To Customer Care |

- Reports
- Utility

Current Interaction — 624

STRATIX™
Relationship
Tracking
System

© 2001 STRATIX™
Patent Pending

| User | Date | Interaction | Response |
|---|---|---|---|
| JKauke | 02-28-01 | Choose From [▼]  C4-8 Hand Off To Customer Care | Choose From [▼] |

Notes Went smoothly. Clarence to get back to me on minor change to contract. Herbert stopped by, says will be try to be there when we deliver Gizmo Report.

| Next Interaction Date | Next Interaction |
|---|---|
| 03-01-01 | Choose From [▼]  R1-1 Set Meeting Report/Survey #2 |

630          628

Interaction Record  ↑720
626

FIG. 31

| User Edit | Date | Interaction | Response | CEL# | Notes |
|---|---|---|---|---|---|
| Npatel ▼ | 2/26/01 | C4-7 Follow Up Initial Contract | C4-7e Signs Contract | 6.0 | Wants Clarence Orchid, his Administrative Assistant, to meet Customer Care team Friday and start immediately. |
| Npatel ▼ | 2/21/01 | C4-7 Follow Up Initial Contract | C4-7a Left Voicemail | 5.535 | |
| Npatel ▼ | 2/16/01 | C4-4 Thank You For Contract | C4-4a Thank You Note | 5.475 | Will check back 2/21. |
| Npatel ▼ | 2/15/01 | C4-3 Deliver Premium Contract | | 5.355 | Just what Herbert wanted. Will take a couple of weeks to get through Legal. |
| Npatel ▼ | 2/10/01 | C4-1 Set Initial Contract Meeting | | 5.205 | Will only have 30 minutes. |
| Npatel ▼ | 2/5/01 | C3-9 Thank You Follow Up | C3-9b Thank You Email | 5.130 | Thanks for getting answers needed. |
| ▼ | 2/4/01 | A4-1 Monthly Email Tip | | 5.040 | |
| Npatel ▼ | 2/4/01 | C3-8 Follow Up Meeting Initial Proposal | C3-8t WANTS A CONTRACT! | 5.000 | The kicker was our track record and comfort level. |
| Npatel | 2/1/01 | C3-7 Follow Up | C3-7l Set | 4.999 | Needs others to agree. |

FIG. 32

| | | Initial Proposal | Follow Up Meeting | | |
|---|---|---|---|---|---|
| Npatel ▼ | 1/25/01 | C3-4 Thank You For Initial Proposal | C3-4a Thank You Note | 4.999 | |
| Npatel ▼ | 1/24/01 | C3-3 Deliver Premium Initial Proposal | | 4.999 | Feels good. |
| Npatel ▼ | 1/20/01 | C3-1 Set Initial Proposal Meeting | | 4.895 | |
| Npatel ▼ | 1/15/01 | C2-7 Thank You For Facts | C2-7b Thank You Email | 4.820 | |
| Npatel ▼ | 1/14/01 | C2-5 Meeting On Facts | C2-5d Our Facts Have Enough | 4.730 | |
| Npatel ▼ | 1/12/01 | C2-4 Set Meeting Confirm Facts | | 4.680 | |
| Npatel ▼ | 1/10/01 | C2-3 Premium Fact Finding | | 4.605 | Very cooperative. |
| Npatel ▼ | 1/9/01 | C2-1 Follow Up Fact Finding | C2-1i Set Meeting To Get Facts | 4.455 | Doesn't have time to do on own afterall. Wants us to do. |
| Npatel ▼ | 1/4/01 | C1-2 Thank You For Appointment | C1-2a Thank You Note | 4.380 | Offered to get facts, if need be. |

FIG. 33

| | | | | | |
|---|---|---|---|---|---|
| Npatel ▼ | 1/3/01 | C1-1 Initial Appointment | C1-1bb Customer To Develop Facts | 4.260 | Wants to do as much as they can, thinks will be faster. |
| ▼ | 1/2/01 | A4-1 Monthly Email Tip | | 4.210 | |
| Npatel ▼ | 1/2/01 | C1-1 Initial Appointment | C1-1a Confirm Appointment | 4.170 | |
| Lsharp ▼ | 12/21/00 | A2-7 Ongoing Thank Yous | A2-7a Thank You Note | 4.120 | Reminded name of person who will come to see. |
| Lsharp ▼ | 12/21/00 | A2-6 Live Conversation | A2-6dd Hand Off In Person Appt. | 4.000 | Has a go ahead from others. |
| Lsharp ▼ | 12/20/00 | A2-6 Live Conversation | A2-6a Call Back 12/21/00 | 2.080 | Doesn't have feedback yet on email. |
| Lsharp ▼ | 12/19/00 | A2-6 Live Conversation | A2-6d Send Why XYZ Company Email | 2.040 | Wants to send to others. |
| Lsharp ▼ | 12/17/00 | A2-1 Leave Voice Mail #1 | | 1.150 | |
| ▼ | 12/17/00 | A1-4 Brochure | | 1.120 | |
| ▼ | 12/10/00 | A1-3 3rd Postcard | | 1.090 | |
| | | | | | |

FIG. 34    650

Contact:
Title:
Phone:
Email:
_ Email Permission

Company:
Address1:
Address2:
City/State/Zip:
CEL#

ADD CONTACT

| Select Contact Information | Select Profiling Questions | Select Knowledge Screening |
|---|---|---|
| Choose From ▼ | Choose From ▼ | Choose From ▼ |

| | |
|---|---|
| Salutation: | |
| First Name: | |
| Middle Name: | |
| Last Name: | |
| Title: | |
| Company: | |
| Address1: | |
| Address2: | |
| City: | |
| State: | |
| Zipcode: | |
| Phone: | |
| Extension: | |
| FAX: | |
| Cell Phone: | |
| Pager: | |
| Voice Mail: | |
| 800#: | |
| Email: | |
| Secondary Email: | |
| URL: | |
| Starting CEL # | |
| Reference #: | |
| Source: | |
| Source Details: | |
| Customer #: | |

S T R A T I X™
Relationship
Tracking
System

© 2001 STRATIX™
Patent Pending

| | |
|---|---|
| Prefers Reach Via: | |
| On job (years) | |
| As (title) (years) | |
| Gender: | |
| Delivery Team: | |
| | |
| Alternative Address1: | |
| Alternative Address2: | |
| Alternative City: | |
| Alternative State: | |
| Alternative Zipcode: | |
FIG. 37    ↑730

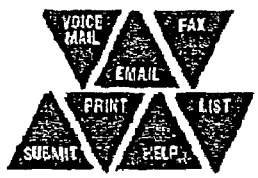

Herbert Ficus　　　　Plants Unlimited
CEO　　　　　　　　17 Green Street
800-456-7890　　　　Suite 100
hficus@plantsunlimited.com　San Francisco, CA 94123
x_ Email Permission　　CEL# 6.000

CONTACT INFORMATION COMPANY DATA

| Select Contact Information | Select Profiling Questions | Select Knowledge Screening |
|---|---|---|
| Choose From ▼ | Choose From ▼ | Choose From ▼ |

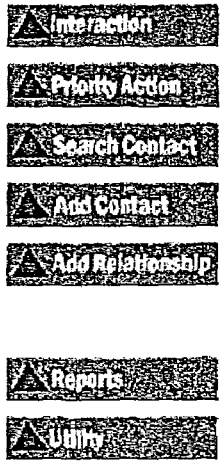

STRATIX
Relationship
Tracking
System

© 2001 STRATIX™
Patent Pending

| Salutation: | Mr. |
|---|---|
| First Name: | Herbert |
| Middle Name: | T |
| Last Name: | Ficus |
| Title: | CEO |
| Company: | Plants Unlimited |
| Address1: | 17 Green Street |
| Address2: | Suite 100 |
| City: | San Francisco |
| State: | CA |
| Zipcode: | 94123 |
| Phone: | 415 456 7890 |
| Extension: | |
| FAX: | |
| Cell Phone: | |
| Pager: | |
| Voice Mail: | |
| 800#: | 456 7890 |
| Email: | hficus@plantsunlimited.com |
| Secondary Email: | |
| URL: | www.plantsunlimited.com |
| Starting CEL # | 1.000 |
| Reference #: | CA Test 1 |
| Source: | List A, Telemarketing |
| Source Details: | Terrific Lists |
| Customer #: | |

| | |
|---|---|
| Prefers Reach Via: | Email |
| On job (years) | 25 |
| As (title) (years) | CEO, 20 |
| Gender: | |
| Age: | 25 |
| Delivery Team: | LSharp, Npatel, JKauke |
| | |
| Alternative Address1: | |
| Alternative Address2: | |
| Alternative City: | |
| Alternative State: | |
| Alternative Zipcode: | |
800
FIG. 39

Herbert Ficus　　Plants Unlimited
CEO　　　　　　17 Green Street
800-456-7890　　Suite 100
hficus@plantsunlimited.com　San Francisco CA 94123
x_ Email Permission　CEL# 6.000#

CONTACT INFORMATION PERSONAL DATA

| Select Contact Information | Select Profiling Questions | Select Knowledge Screening |
|---|---|---|
| Choose From ▼ | Choose From ▼ | Choose From ▼ |

- Interaction
- Priority Action
- Search Contact
- Add Contact
- Add Relationship
- Reports
- Utility

STRATIX
Relationship Tracking System

© 2001 STRATIX™
Patent Pending

| Field | Value |
|---|---|
| Home Address1: | |
| Home Address2: | |
| Home City: | |
| Home State: | |
| Home Zip code: | |
| Home Phone: | |
| Home FAX: | |
| Home Cell | |
| Phone: | |
| Home Voice Mail: | |
| Home Pager: | |
| Home Email: | |
| URL: | |
| Referral Source: | |
| Referral Details | |
| Affinity | |
| Organization: | |
| Cause: | CNPS |
| Person: | |
| Other: | |
| Special Interests | |
| Hobbies: | |
| Sports: | |
| Activities: | |
| Culture: | |
| Music: | Jazz |
| Food: | |
| Drink: | Water |
| Other | |

| | |
|---|---|
| Personal | |
| Spouse: | |
| Significant Other: | |
| Child: | |
| Other relative: | |
| Friend: | Jacob Bills |
| Pet: | Sierra Cat |
| Birthday | 00/00/00 |

Herbert Ficus   Plants Unlimited
CEO   17 Green Street
800-456-7890   Suite 100
hficus@plantsunlimited.com   San Francisco CA 94123
x_ Email Permission   CEL# 6.000

CONTACT INFORMATION RELATIONSHIPS

Select Contact Information  Select Profiling Questions  Select Knowledge Screening

Choose From ▼   Choose From ▼   Choose From ▼

| Go To | Contact | Title | City | Phone | Relationship | CEL# |
|---|---|---|---|---|---|---|
| ▲ | Hope Blooms | CFO | San Francisco | 800-456-7890 | Influencer | 4.999 |
| ▲ | Gratze White | Chairman | San Francisco | 800-456-7890 | Boss | 4.999 |
| ▲ | Tom Paz-ion | Engineer | Los Angeles | 888-725-4444 | None | 2.040 |
| ▲ | Nielson Love | COO | San Francisco | 800-456-7890 | Unknown | 1.000 |
| ▲ | Jill O'Joy | Manager | San Francisco | 800-456-7890 | Billing | 6.000 |
| ▲ | Fred Ready | Foreman | San Francisco | 800-456-7890 | Receiving | 6.000 |
| ▲ | Clarence Orchid | Aide | San Francisco | 800-456-7890 | Assistant | 6.000 |

S T R A T I X
Relationship
Tracking
System

© 2001 STRATIX™
Patent Pending

Herbert Ficus  Plants Unlimited
CEO  17 Green Street
800-456-7890  Suite 100
hficus@plantsunlimited.com San Francisco CA 94123
_Email Permission  CEL# 1.120

VOICE MAIL

Select Contact Information | Select Profiling Questions | Select Knowledge Screening Choose From ▼  Choose From ▼  Choose From ▼

Acquisition Voice Mail #1

Hello, this is _____. I'm calling for XYZ Company, the gizmo company. (We specialize in serving (industry), including (customers.) We've been sending you information about our gizmo in the last couple of weeks. We have an impressive customer list and we're an alliance partner of The Greatest Company and many more.

I'd like to speak with you about how we can drastically reduce your costs.

If you're as busy as most of our customers, I expect you don't have time to babysit gizmos all day. Whether you have 75 gizmos or many more, we can help.

I would appreciate an opportunity to speak with you. I am at 1-888-727-7272. Please feel free to visit our website at www.XYZCompany.com. Or you can send us an email at GIZMOHELP@XYZCompany.com. Thank you for listening, have a great day.!

} — 902

S T R⁂T I X
Relationship
Tracking
System

© 2001 STRATIX™
Patent Pending

Herbert Ficus
CEO
800-456-7890
hficus@plantsunlimited.com
_Email Permission

Plants Unlimited
17 Green Street
Suite 100
San Francisco CA 94123
CEL# 1,150

PROFILING QUESTIONS ACQUISITION

- Interaction
- Priority Action
- Search Contact
- Add Contact
- Add Relationship

- Reports
- Utility

STRATIX
Relationship
Tracking
System

© 2001 STRATIX™
Patent Pending

| Select Contact Information | Select Profiling Questions | Select Knowledge Screening |
|---|---|---|
| Choose From ▼ | Choose From ▼ | Choose From ▼ |

| First Outbound Telemarketing Script: | |
|---|---|
| Hello, I'm _____ with XYZ Company, the gizmo company. (We specialize in serving (industry), including (customers.) We sent you the purple gizmo brochure. (Are the person people call for gizmos? Do you have more than 75 gizmos in your operation? | 175 |
| IF NO, GO TO "NOT QUALIFIED CLOSE" AT END OF SCRIPT. | |
| IF YES, CONTINUE: That's good, then we could drastically cut your downtime, perhaps by as much as 66%. And reduce your costs. Our customers tell us they save up to 25%. We're an alliance partner of The Greatest Company. We offer one stop shopping for all your gizmo needs, everything you need from one source. Does this make sense to you? | |
| IF ANXIOUS TO GET OFF: At the very least, we would appreciate the privilege of sending you more information via email. With your permission we would like to follow up within a week or two after you have looked at the material. Perhaps then you will be able to make an intelligent choice about making an appointment to see one of our representatives. Does this seem reasonable to you? May I have your email address, please? (IF ALREADY HAVE IT, CONFIRM IT.) | |
| *****SEND "WHY XYZ COMPANY EMAIL." *****PUT ON EMAIL LIST. (YES/NO) | |
| What would be a better day to follow up? Would (Thursday or Friday) of next week be best? *****SET CALLBACK DATE AND TIME | |
| IF NOT ANXIOUS TO GET OFF: Then I have a few questions that might help us both decide if there is a fit. | |
| (Critical to get gizmo count and to set appointment. Try to get email permission if don't have it already | |
| 1. How many gizmos do you have? (NEEDS TO BE MORE THAN 75. If you have a figure confirm it.) | 175 |

| | |
|---|---|
| IF NO: Do you plan to add more gizmos soon?<br>IF STILL NO, GO TO "NOT QUALIFIED<br>CLOSE" AT END OF SCRIPT. | |
| IF YES, CONTINUE: | |
| 2. Is it important that you have gizmos?<br>(YES/NO) How important is it-on a scale of 1 to<br>5 with 5 being really important? (ANSWER HAS<br>TO BE 3 TO 5. IF LESS THAN 3, GO TO "NOT<br>QUALIFIED CLOSE" AT END OF SCRIPT.) | 5 |
| 3. What would you say the complaint level is on<br>what you<br>have to deal with-on a scale of 1 to 5 with 5<br>being really bad?<br>(ANSWER HAS TO BE 3 TO 5. IF LESS THAN<br>3, GO TO "NOT QUALIFIED<br>CLOSE" AT END OF SCRIPT.) | 5 |
| 4. What about gizmo use? Is it high or low-on a<br>scale of 1 to 5 with 5 being really<br>high? (ANSWER HAS TO BE 3 TO 5. IF LESS<br>THAN 3, GO TO "NOT<br>QUALIFIED CLOSE" AT END OF SCRIPT.) | 5 |
| 5. How are you handling the situation now? Are<br>you doing it yourselves or do you have a<br>contract?<br>(THEMSELVES IS A GO NOW.) | Themselves |
| 6. If a contract: What is the contract for?<br>(LIMITED CONTRACT IS GOOD.) | |
| (Wherever you stop in questions #1-6, assuming<br>they have given the right answers): | |
| 7. It sounds like we might have a fit. I'd like to set<br>up an appointment. When would<br>work best for you? (Details on who the<br>appointment will be with, etc.) | Wants Why XYZ<br>Company email first. |
| *****SET APPOINTMENT DATE AND TIME | |
| *****SET CALL BACK TIME | 12/21/00 |
| *****DON'T DO IF YOU HAVE ALREADY DONE<br>THIS!!! IF YOU SENT THE<br>WHY XYZ COMPANY EMAIL, YOU HAVE<br>DONE THIS!!! | |
| 8. I'd like to put you on our email list so we can<br>send you tips about gizmos. May I get<br>your email address? (Or confirm it, if you have<br>it.) | hficus @<br>PlantsUnlimited.com |
| *****PUT ON EMAIL LIST. (YES/NO) | Yes |
| *****SEND FIRST EMAIL TIP (YES/NO) | |
| *****SEND WHY XYZ COMPANY (YES/NO) | Yes |
| 9. Just curious. Had (or have) you heard of XYZ<br>Company before?<br>*****HEARD OF XYZ Company (Unaware, Aided<br>Aware, Aware) | Aided Aware |

FIG. 45

| | |
|---|---|
| QUALIFIED CLOSE:<br>Either I know _____ will look forward to meeting with you. Or We look forward to meeting with you when the time is right and in the meantime, you'll get our gizmo email tips. You may want to visit our Web site at www.XYZCompany.com.<br>Thank you for your time. | |
| NOT QUALIFIED CLOSE:<br>Our contract only makes sense for companies with more than 75 gizmos, so I'm afraid this would not be worth your time right now. May I check back with you in the future? | |
| *****CHECK BACK IN FUTURE (YES/NO) | |
| *****AT END OF CALL CHOSE RIGHT CALL RESPONSE AND TAKE ACTION TO FULFILL COMMITMENTS TO CONTACT. | |
| Assess quality of contact as influencer on Scale 1 to 5 with 5 being top for: | |
| External | |
| Internal | |
| *****CONFIRM CONTACT INFORMATION. | |

FIG. 46      1020

Herbert Ficus  Plants Unlimited
CEO  17 Green Street
800-456-7890  Suite 100
hficus@plantsunlimited.com  San Francisco CA 94123
x Email Permission  CEL# 4.000

PROFILING
QUESTIONS
CLOSING

Select Contact Information | Select Profiling Questions | Select Knowledge Screening

Choose From ▼ | Choose From ▼ | Choose From ▼

- Interaction
- Priority Action
- Search Contact
- Add Contact
- Add Relationship
- Reports
- Utility

| Ongoing Closing Questionnaire | |
|---|---|
| 1. Most common complaints about gizmos? | |
| 2. How long have you been on the job? | 25 years |
| 3. How long has your company been in business? | 25 years |
| 4. What is your revenue? ____actual or range: | $100-500 million |
| 5. Type of business? | |
| 6. How many locations? | 3 |
| 7. Yours is the ____, right? | Headquarters |
| 8. You have between _____ number of people now, right? | 1,000-4,999 |
| 9. Growth expectations over the next year in terms of people? _____% | |
| 10. I have these names of others in your company who would be involved in contracting for gizmos _____. Tell me about them and their role. What is the process to get a contract signed in your organization? What can you do to move the process along? (Probe on the next steps.) Can you carry the ball on this or do we need to meet with some of the other people? | |
| 11. We need a signed contract, the first payment and a purchase order a week prior to the start. When can we start? Set a realistic start date. Working backwards from that date organize getting the information needed to do a proposal. | 03/01/00 |
| 12. Note competition if any. | ABC Company |
| 13. Set closing status (A This month, B In next days, C In next 60 days) | |
| 14. Once a signed contract: | |
| a. Note: Contract length: | 3 years |
| Yearly revenue: | $35,000 |
| Monthly revenue: | 2,917 |
| # of locations under contract | 1 |
| b. Get an XYZ Company internal customer # assigned. | |

STRATIX
Relationship
Tracking
System

© 2001 STRATIX™
Patent Pending

| | |
|---|---|
| c. Determine Customer Lifetime Value (CLV) potential | |
| d. Set time to bring in Customer Care people to meet with their key staff members. | |
| 15. After each encounter with person, | |
| a. Set closing priority. (Scale 1 to 5 with 5 being top.) | 5 |
| b. Determine revenue potential on scale 1 to 5 with 5 being top for<br>Up Sell<br>Cross sell<br>Increase Volume | |
| c. Assess quality of contact as influencer on scale 1 to 5 with 5 being top for<br>External<br>Internal | |
| d. Assess Awareness Level for attitude towards purchase (Consideration, Intended). | |
| e. Categorize Attitude on scale 1 to 5 with 5 being top for<br>Embracing Attitude<br>Overcoming Attitude | |
| f. Add to Contact Information. | |

Herbert Ficus  Plants Unlimited
CEO  17 Green Street
800-456-7890  Suite 100
hficus@plantsunlimited.com  San Francisco CA 94123
X Email Permission  CEL# 7.000

PROFILING QUESTIONS RETENTION

- Interaction
- Priority Action
- Search Contact
- Add Contact
- Add Relationship
- Reports
- Utility Select Contact Information | Select Profiling Questions | Select Knowledge Screening Choose From ▼   Choose From ▼   Choose From ▼

S T R A T I X*
Relationship Tracking System

© 2001 STRATIX™
Patent Pending

| Ongoing Retention Questionnaire | |
|---|---|
| 1. Most common gizmos? | |
| 2. Who decides the type of gizmo to purchase within the organization? | |
| 3. Any cultural issues regarding gizmos? | |
| 4. Number of people employed at specific locations? | |
| 5. Number of gizmos per location? | |
| 6. Any changes in locations planned? | |
| 7. Any specialist departments who operate more than normal hours? | |
| 8. Any major changes, trends in your industry and how are they affecting you? | |
| 9. Any major changes, trends in your company and how are they affecting you? | |
| 10. Any major changes, trends in your company's gizmo requirements and how are they affecting you? | |
| 11. Coordinate with Internal Sales as renewal time nears. | |
| a. Assess Retention Status (A Assured, B Some Issues, C Uncertain) | |
| b. Determine Customer Maintenance Level (scale 1 to 5 with 5 being high) | |
| c. Determine Net Contribution to date. | |
| 12. Assess quality of this customer as a reference (A Unconditional, B Conditional) | |
| 13. After each encounter with person: | |
| a. Set Retention Priority (scale 1 to 5 with 5 being top) | |
| b. Determine revenue potential on scale 1 to 5 with 5 being top for<br>Up Sell<br>Cross Sell<br>Increase Volume | |
| c. Assess quality of contact as influencer on scale 1 to 5 with 5 being top for<br>External<br>Internal | |
| d. Add to Contact Information | |

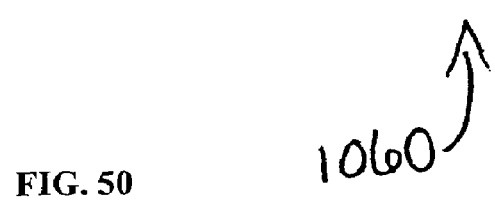
FIG. 50

Herbert Ficus　　Plants Unlimited
CEO　　17 Green Street
800-456-7890　　Suite 100
hficus@plantsunlimited.com　San Francisco CA 94123
x Email Permission　　CEL# 7.000

PROFILING QUESTIONS RETENTION

- Interaction
- Priority Action
- Search Contact
- Add Contact
- Add Relationship
- Reports
- Utility

| Select Contact Information | Select Profiling Questions | Select Knowledge Screening |
|---|---|---|
| Choose From ▼ | Choose From ▼ | Choose From ▼ |

New Customer Survey #1:

| Customer Satisfaction: | |
|---|---|
| Just wanted to check in with you and see if everything is going smoothly for you as we get started working with you. We don't want things ever to just be okay. We want things to be so wonderful that you'll be telling others about us. | |
| 1. Have we treated you right in making the transition? | |
| 2. Anything I should be watching out for? | |
| 3. Anything you are concerned about? | |
| 4. So I make sure to pay special attention to it, is there anything that you are particularly looking forward to in working with us?<br><br>(Answers will indicate new CEL level or validate that they remain in old one. Note change in level here and any general comments. Primary evaluation here is, has XYZ Company moved past Expectant or Trial levels or not? Does anything need to be done now to ensure that this contact becomes a Loyal customer at a minimum?) | |
| Industry Trend Information: | |
| 5. Any major changes, trends in your industry and how are they affecting you? | |
| 6. Any major changes, trends in your company and how are they affecting you? | |
| 7. Any many changes, trends in your company's gizmo requirements and how are they affecting you? | |

S T R A T I X
Relationship
Tracking
System

© 2001 STRATIX™
Patent Pending

| Targeting Information: | |
|---|---|
| 9. Where do you get your information about the gizmo industry? (Publications, conferences, trade shows, people.) | |
| 10. Who do you listen to? | |
| 11. Who do you think of as a thought leader? Would XYZ Company be on your list? | |
| 12. If they are not already on it: Would you like to be on our email list for a Free Gizmo Email Tip of the Month? | |
| 13. Add to Contact Information. | |

Figure 52    1080

Herbert Ficus
CEO
800-456-7890
hficus@plantsunlimited.com
X Email Permission

Plants Unlimited
17 Green Street
Suite 100
San Francisco CA
94123
CEL# 6.000

KNOWLEDGE SCREEN RELATIONSHIP VALUE

- Interaction
- Priority Action
- Search Contact
- Add Contact
- Add Relationship
- Reports
- Utility Select Contact Information — Choose From ▼

Select Profiling Questions — Choose From ▼

Select Knowledge Screening — Choose From ▼

S T R A T I X
Relationship
Tracking
System

© 2001 STRATIX™
Patent Pending

| Customer Lifetime Value (CLV) | |
|---|---|
| Potential (three years) | $282,592 |
| Net Contribution (to date) | |
| Difference | |

← 109

| Revenue Potential Rating | |
|---|---|
| Up Sell | |
| Cross Sell | |
| Increase Volume | |

| Buzz Influence | |
|---|---|
| # Referrals | |
| # References | |
| # Testimonials | |

← 1092

| Influencer Rating | |
|---|---|
| External | 4 |
| Internal | |

| Acquisition Value | |
|---|---|
| Put on Email List | Yes |
| Check Back Later | |

| Closing Value | |
|---|---|
| Priority | 5 |
| Closing Status | this month |

| Retention Value | |
|---|---|
| Priority | |
| Retention Status | |
| Customer Maintenance Level | |

Herbert Ficus  Plants Unlimited
CEO  17 Green Street
800-456-7890  Suite 100
hficus@plantsunlimited.com San Francisco CA 94123
x Email Permission  CEL# 6.000

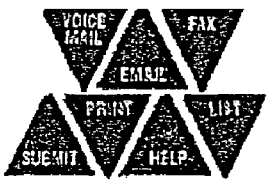

KNOWLEDGE SCREEN PRODUCTS/ SERVICES

Select Contact Information | Select Profiling Questions | Select Knowledge Screening Choose From [▼]  Choose From [▼]  Choose From [▼]

| | |
|---|---|
| # Gizmos: | 175 |
| Importance: | 5 |
| Problems With: | 5 |
| Gizmo Use: | 5 |
| How Handle: | Themselves |
| Most Common Complaints: | |
| Major Issues: | |
| Contract Length: | 3 years |
| Start Date | 03/01/01 |
| Yearly Revenue: | $360,000 |
| Monthly Revenue: | $30,000 |
| # of Locations under Contract: | 1 |

S T R⍟T I X™
Relationship
Tracking
System

© 2001 STRATIX™
Patent Pending

Herbert Ficus  Plants Unlimited
CEO  17 Green Street
800-456-7890  Suite 100
hficus@plantsunlimited.com  San Francisco CA 94123
x Email Permission  CEL# 6.000

KNOWLEDGE SCREEN PRODUCTS/ SERVICES

Select Contact Information  Select Profiling Questions  Select Knowledge Screening Choose From ▼  Choose From ▼  Choose From ▼

- Interaction
- Priority Action
- Search Contact
- Add Contact
- Add Relationship

- Reports
- Utility

| | |
|---|---|
| # Gizmos: | 175 |
| Importance: | 5 |
| Problems With: | 5 |
| Gizmo Use: | 5 |
| How Handle: | Themselves |
| Most Common Complaints: | |
| Major Issues: | |
| Contract Length: | 3 years |
| Start Date: | 03/01/01 |
| Yearly Revenue: | $35,000 |
| Monthly Revenue: | $2,917 |
| # of Locations under Contract: | 1 |

STRATIX
Relationship
Tracking
System

© 2001 STRATIX™
Patent Pending

Herbert Ficus  Plants Unlimited
CEO  17 Green Street
800-456-7890  Suite 100
hficus@plantsunlimited.com  San Francisco CA 94123
x Email Permission  CEL# 6.000

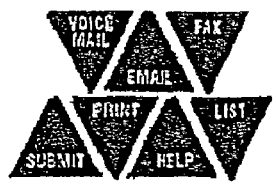

KNOWLEDGES SCREEN COMPANY INFORMATION

Select Contact Information    Select Profiling Questions    Select Knowledge Screening Choose From ▼    Choose From ▼    Choose From ▼

- Interaction
- Priority Action
- Search Contact
- Add Contact
- Add Relationship

- Reports
- Utility

| Size: | $100-500 million |
|---|---|
| SIC Code: | |
| Industry: | Industry |
| Other: | |
| Type of Business: | |
| Year End: | 12/31 |
| Years in Business: | 25 |
| Credit Code: | Very Good |
| Metro: | SFO San Francisco |
| Enterprise Status: | Headquarters |
| # Employees: | 1,000-4,999 |
| Expected Growth: | |
| # Locations: | 3 |

S T R A T I X™
Relationship
Tracking
System

© 2001 STRATIX™
Patent Pending

Herbert Ficus　　　　Plants Unlimited
CEO　　　　　　　　17 Green Street
800-456-7890　　　　Suite 100
hficus@plantsunlimited.com　San Francisco CA 94123
x_ Email Permission　CEL# 6.000

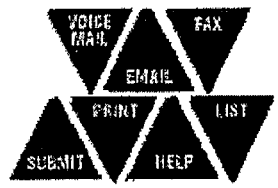

KNOWLEDGE SCREEN BUSINESS INTELLIGENCE

| Select Contact Information | Select Profiling Questions | Select Knowledge Screening |
|---|---|---|
| Choose From ▼ | Choose From ▼ | Choose From ▼ |

Acquisition

| Date | Saw Marketing Materials | Awareness Level |
|---|---|---|
| 12/2/00 | Yes | Aided Aware |

Closing

| Date | Feedback Notes | Awareness Level |
|---|---|---|
| | | |

Retention

| Date | Survey Notes | Satisfaction Level | Modified CEL Level |
|---|---|---|---|
| | | | |

- Interaction
- Priority Action
- Search Contact
- Add Contact
- Add Relationship
- Reports
- Utility

STRATIX
Relationship
Tracking
System

© 2001 STRATIX™
Patent Pending

| Targeting Research Commentary |
|---|
| Independent study 8/12/00 tested potential for XYZ Company. XYZ relatively unknown, but critical need found with companies that have more than 150 gizmos and over $100 million in revenue. |
| Awareness:　　　　　　　　　　Unaware |

| Tracking Research Commentary |
|---|
| Independent study 12/27/00 rated XYZ Company against its competitors. XYZ being considered more frequently than ABC Company by a ratio of 10:1. |
| Awareness:　　　　　　　　　Consideration |

| Competition | | | | |
|---|---|---|---|---|
| ABC Company | | | | |

Individual Correlation With Awareness/Satisfaction Research

| Date | Awareness Level | Satisfaction Level | Existing CEL Level | Modified CEL Level |
|---|---|---|---|---|
| 08/12/00 | Unaware | | 0.000 | |
| 12/19/00 | Aided Aware | | 2.040 | |
| 12/27/00 | Consideration | | 4.000 | |

Herbert Ficus  Plants Unlimited
CEO  17 Green Street
800-456-7890  Suite 100
hficus@plantsunlimited.com  San Francisco CA 94123
x_ Email Permission  CEL# 6.000

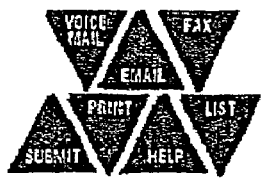

ADD RELATIONSHIP

Select Contact Information | Select Profiling Questions | Select Knowledge Screening Choose From ▼   Choose From ▼   Choose From ▼

- Interaction
- Priority Action
- Search Contact
- Add Contact
- Add Relationship
- Reports
- Utility

S T R A T I X
Relationship
Tracking
System

© 2001 STRATIX™
Patent Pending

| | |
|---|---|
| Relationship: | Administrative Assistant |
| Salutation: | Mr. |
| First Name: | Clarence |
| Middle Name: | |
| Last Name: | Orchid |
| Title: | Aide |
| Company: | Plants Unlimited |
| Address1: | 17 Green Street |
| Address2: | Suite 100 |
| City: | San Francisco |
| State: | CA |
| Zipcode: | 94123 |
| Phone: | 415-456-7890 |
| Extension: | |
| FAX: | |
| Cell Phone: | |
| Pager: | |
| Voice Mail: | |
| 800#: | 456-7890 |
| Email: | corchid@plantsunlimited.com |
| Secondary Email: | |
| URL: | www.plantsunlimited.com |
| Starting CEL #: | 6.000 |
| Reference #: | CA Test 1-add |
| Source: | CA Test 1 |
| Source Details: | Herbert Ficus |
| Customer #: | |
| Prefers Reach Via: | E-mail ▼ |

| | |
|---|---|
| On job / yrs | |
| As _____ years | |
| Gender: | Male |
| Delivery Team: | |
| | |
| Alternative Address1: | |
| Alternative Address2: | |
| Alternative City: | |
| Alternative State: | |
| Alternative Zipcode: | |
FIG. 60    1160

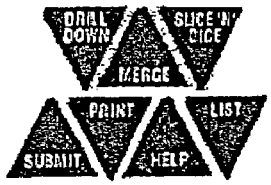

REPORTS

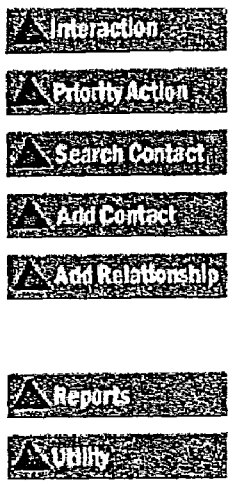

S T R A T I X™
Relationship
Tracking
System

© 2001 STRATIX™
Patent Pending

Reports

Input Templates:
Strategic Brand Readiness (SBR) Factor Template
Customer LifeCycle Profitability Model Template
Interaction ROI (I ROI) Template

Reports:
Strategic Brand Readiness (SBR) Summary Report

Customer LifeCycle Profitability Model
Alternative Strategies Comparison

Customer LifeCycle Profitability Model Summary Report

Interaction ROI (I ROI) Summary Reports
    Phase Level Process
    Phase Level Events
    CEL Level Process
    CEL Level Events Individual Interaction ROI (I ROI) Report Interaction ROI (I ROI) Model Report Individual Correlation with Awareness/Satisfaction Research Correlation with Awareness/Satisfaction Research
    Model Report Deposition of Contacts Summary Reports
    By Phase Level
    By Status
    By Origination Top Priority Customers Profile Reports
    Characteristics
    Attributes

NETWORK BASED SYSTEM AND METHOD FOR MARKETING MANAGEMENT

CROSS REFERENCE TO RELATED APPLICATIONS

This application claims the benefit of U.S. Provisional Application No. 60/265,019 filed Jan. 30, 2001, which is hereby incorporated by reference in its entirety.

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

This invention relates generally to a Marketing Business System (MBS), and more particularly, to network-based systems and methods to improve business intelligence, mitigate risks and maximize profit flows by tracking transactions and daily interactions.

A company typically conducts many levels of reviews when determining whether to engage in a specific marketing strategy. Most of these reviews and selection of the marketing strategy are based on general experiences of individuals involved but, often are not quantified in terms of financial returns. Decisions regarding what metrics should be used are typically based on individual tactics in either Marketing, Sales or Customer Care and are not derived from an overall strategy implementation across the entire Front Office or from relationships.

Known marketing management methods and systems, particularly related to the front office, have several disadvantages. For example, current management methods and systems are largely paper-based and time consuming. Often the information accumulated by various individuals is lost because the information is not organized, stored or cross-referenced for future purposes. Additionally, the information is not summarized or quantified to allow management to make meaningful decisions. The problem is more acute in large organizations having multiple divisions, and especially organizations with globally distributed divisions where managing marketing function requires immediate attention, review, and decision making at various levels across the globe.

BRIEF DESCRIPTION OF THE INVENTION

In an exemplary embodiment, a searchable web-based system sets up the relationship in the database to build profiles, track results and generate reports. The system also establishes leading indicator metrics baselines to determine the current condition of the business. After the initial set up is completed, the system collects relevant data for the front office of the business against a unique identifier for easy retrieval and update, stores the data in the centralized database and cross-references against unique identifiers. The system retrieves the data from the centralized database in response to an inquiry and generates reports to facilitate the front office management to improve business productivity, reduce risks and maximize profits.

In another exemplary embodiment, a method for implementing a strategic marketing business process is disclosed. The method helps clients prepare product and service brands to mitigate risks and maximize profits. The method utilizes a web-based system including a server system coupled to a centralized interactive database and at least one client system. The method includes the steps of analyzing new marketing opportunities, identifying a new marketing strategy after alternative new marketing strategies are quantified and prioritized, refining the new marketing strategy, and implementing the new marketing strategy. The method further includes documenting benefits and leading indicator metrics to evaluate the impact of the new marketing strategy. Based on the information obtained, modifications are made to the new marketing strategy to refine it further to reduce risks and maximize profits.

In yet another exemplary embodiment of the invention, the method for providing information to a client regarding the current condition of the client's business as reflected in leading indicator metrics baselines including (a) a baseline for scoring the business's relative market position and (b) a baseline for quantifying Front Office strategy and relationship performance. The method for scoring the business's relative market position includes selecting categories from predefined categories, selecting a choice of description from available choices for the selected category that appropriately describes the business, and generating a Strategic Brand Readiness Factor to reflect the current condition of the business after analyzing selected choices of the description based on a predetermined methodology. The method for quantifying Front Office strategy and relationship performance configures the RT System as an Analytical Framework and includes comparing past performance with anticipated future performance of strategy implementation in a Customer LifeCycle Profitability Model supplemented by an Interaction ROI Model. These models encompass the customers' entire life cycle and then track success in implementation against assumptions. The Analytical Framework also includes the ability to capture patterns of customer behavior precipitating an analysis of the cause and effect of relationships on profitability.

The MBS in yet another exemplary embodiment, includes a web-enabled interactive database to store and process data corresponding to contacts, businesses, users, and various interactions and cross referencing the accumulated data against unique identifiers for easy retrieval and update. The database further stores specific data corresponding to Voice Mail Scripts, and Telemarketing Scripts to be used during an Acquisition Phase, a List of Profiling Questions Script to be used during a Closing Phase, a List of Profiling Questions Script to be used during a Retention Phase and Knowledge Screens. Based on the data stored, the MBS produces a variety of reports for the management.

BRIEF DESCRIPTION OF THE DRAWINGS

FIG. 13 illustrates a tactics grid that lists a number of tactics;

FIG. 14 illustrates a Relative Interaction Value (RIV) Number Grid;

FIG. 16 is an exemplary embodiment of an Access page user interface utilized with the MBS shown in FIG. 1;

FIG. 17 is an exemplary embodiment of a "Priority Action" user interface;

FIG. 18 is an exemplary embodiment of a Planned Interaction "Interaction" user interface;

FIG. 19 is a continuation of the "Interaction" user interface shown in FIG. 18;

FIG. 21 is an exemplary embodiment of a "Search Contact" user interface;

FIG. 22 is an exemplary embodiment of an alternative searched for "Interaction" user interface;

FIG. 23 is a continuation of the "Interaction" user interface shown in FIG. 22;

FIG. 24 is a continuation of the "Interaction" user interfaces shown in FIGS. 22 and 23;

FIG. 26 is an exemplary embodiment of another Planned Interaction "Interaction" user interface;

FIG. 27 is a continuation of the "Interaction" user interface shown in FIG. 26;

FIG. 28 is a continuation of the "Interaction" user interface shown in FIGS. 26 and 27;

FIG. 29 is a continuation of the "Interaction" user interface shown in FIGS. 26, 27, and 28;

FIG. 31 is an exemplary embodiment of another Planned Interaction "Interaction" user interface;

FIG. 32 is a continuation of the "Interaction" user interface shown in FIG. 31;

FIG. 33 is a continuation of the "Interaction" user interface shown in FIGS. 31 and 32;

FIG. 34 is a continuation of the "Interaction" user interface shown in FIGS. 31, 32, and 33;

FIG. 36 is an exemplary embodiment of an "Add Contact" user interface;

FIG. 37 is a continuation of the "Add Contact" user interface shown in FIG. 36;

FIG. 38 is an exemplary embodiment of a "Contact Information Company Data" user interface;

FIG. 39 is a continuation of the "Contact Information Company Data" user interface shown in FIG. 38;

FIG. 40 is an exemplary embodiment of a "Contact Information Personal Data" user interface;

FIG. 42 is an exemplary embodiment of a "Contact Information Relationships" user interface;

FIG. 43 is an exemplary embodiment of a "Voice Mail Script" user interface;

FIG. 44 is an exemplary embodiment of a first screen of a "First Outbound Telemarketing Script" user interface;

FIG. 45 is a second screen of the "First Outbound Telemarketing Script" user interface;

FIG. 46 is a third screen of the "First Outbound Telemarketing Script" user interface;

FIG. 47 is an exemplary embodiment of a first screen of a "Profiling Questions Closing Script" user interface;

FIG. 48 is a second screen of the "Profiling Questions Closing Script" user interface;

FIG. 49 is an exemplary embodiment of a first screen of a "Profiling Questions Retention Script" user interface;

FIG. 50 is a second screen of the "Profiling Questions Retention Script" user interface;

FIG. 51 is an exemplary embodiment of a first screen of "Profiling Questions Retention Survey #1" user interface;

FIG. 52 is a second screen of the "Profiling Questions Retention Survey #1" user interface;

FIG. 53 is an exemplary embodiment of a "Relationship Value Knowledge Screen" user interface;

FIG. 54 is a continuation of the Relationship Value Knowledge Screen user interface shown in FIG. 53;

FIG. 55 is an exemplary embodiment of a "Products/Services Knowledge Screen" user interface;

FIG. 56 is an exemplary embodiment of a "Company Information Knowledge Screen" user interface;

FIG. 57 is an exemplary embodiment of a "Business Intelligence Knowledge Screen" user interface;

FIG. 59 is an exemplary embodiment of an "Add Relationship" user interface;

FIG. 60 is a continuation of the "Add Relationship" user interface shown in FIG. 59;

FIG. 61 is an exemplary embodiment of a "Reports" user interface; and

DETAILED DESCRIPTION OF THE INVENTION

Figure 1:
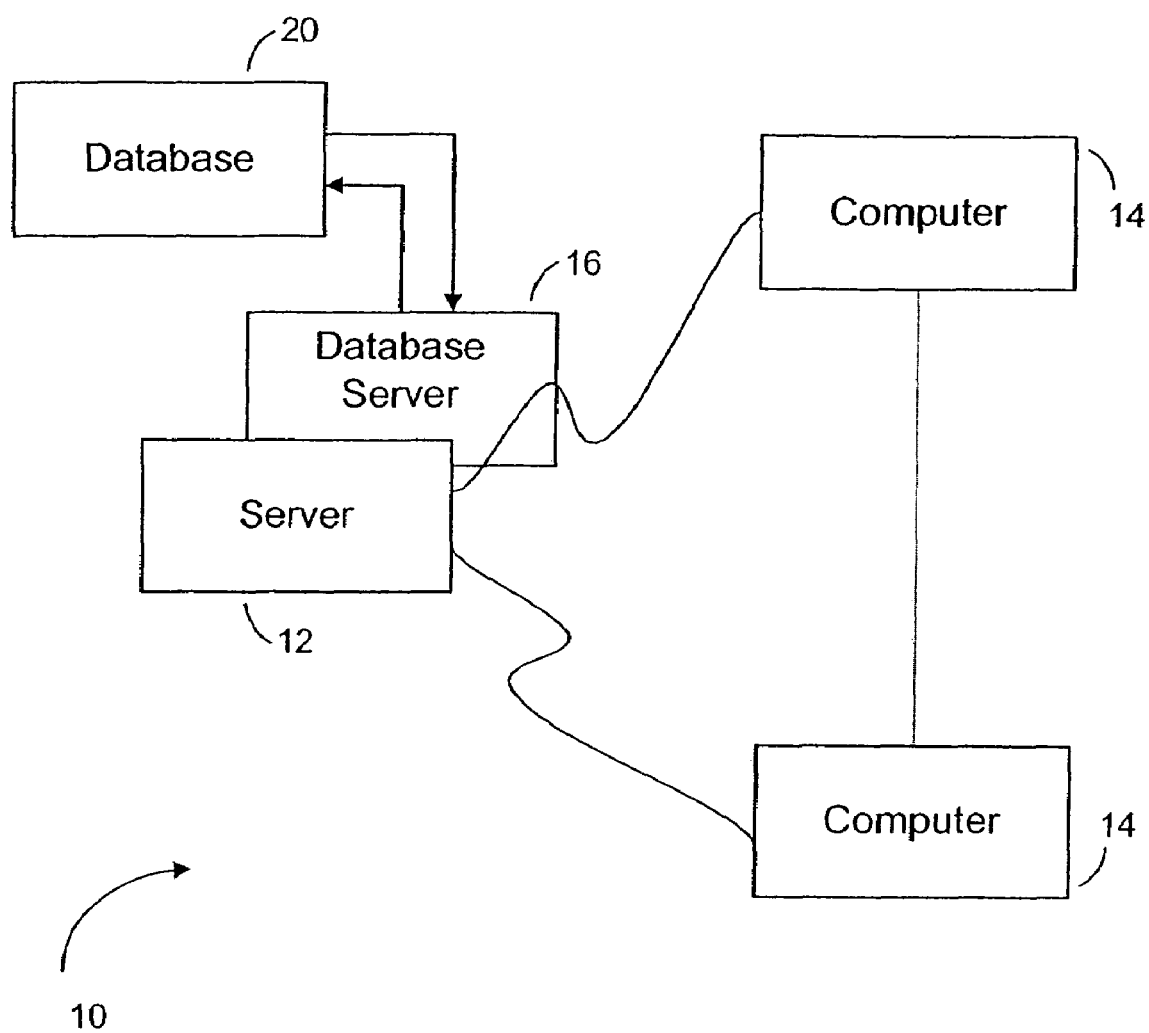
FIG. 1 is a simplified block diagram of a Marketing Business System (MBS) including a database architecture.

Exemplary embodiments of systems and processes that facilitate integrated network-based electronic reporting and workflow process management related to a Marketing Business System (MBS) are described below in detail.

MBS Overview:

The MBS implements a strategic marketing business process, also known as business intelligence consulting, to help clients prepare product and service brands to mitigate risks and increase profit flows. Business processes are formalized in the MBS. The MBS provides a framework for a business to increase profit flows by organizing around its customers, placing a value on all its relationships and testing strategies in advance of investment. The resulting proprietary metrics provide a competitive edge which is differentiation based on exclusive customer relationships.

The MBS captures interaction and transaction details and provides on-line, up-to-date information upon request. The MBS tracks details regarding a specific transaction from inception to completion, quantifying the Interactions, and provides a status of these details to users. In the exemplary embodiment, the system utilizes at least one of a Relational Database and a Multidimensional Database with a client user interface front-end for administration and a web interface for standard user input and reports. Information is accessed in the database through Structured Query Language (SQL), OLAP (On-Line Analytical Processing) software and other analytical software tools.

The MBS supports various levels of management hierarchy and provides access to individuals based on the position held by the individual within the business entity. The MBS has capability to download data extracted to populate commercialized database programs or spread sheet software, which provides the enduser with additional flexibility. Similarly, the data extracted can be uploaded to the MBS from commercialized database programs or spreadsheet software.

The business process implemented by the MBS follows corporate strategic planning to organize a Front Office to meet overall business objectives using a promising marketing strategy. The Front Office of a business entity refers to Marketing, Sales, and Customer Care of the business entity. The business process not only completes the next level of strategic marketing planning, but it tracks the actual results accomplished during implementation of a promising marketing strategy throughout the Front Office, creating the metrics that allow success to be replicated. The business process is a Knowledge Management application for Business Intelligence. The tracking mode of the business process is an enhancement to Enterprise Resource Planning (ERP) and Customer Relationship Management (CRM) and integrates data from ERP and CRM essentially making the CRM tool more intelligent and tying customer relationship management process to business objectives, marketing strategy and transactions. The knowledge gained from the use of the business process in planning and tracking modes may be stored in an existing Knowledge Management tool for easy access by the Front Office personnel. Businesses more likely to find the business process attractive are the businesses that value their relationships with customers and want to have customers for life, operate in the business-to-business arena, businesses that are mid-sized and established firms with a high value offering and work with large numbers of customer base either as prospects or customers or both.

More specifically, the Strategic Marketing Business Process, or Business Intelligence Business Process mitigates risk by giving management a framework to understand and analyze business by resolving the following issues:

1) Why the customers buy from and stay with the business,

2) How to strengthen customer relationships,

3) What patterns of behavior lead to more profitable results for the business, i.e. the cause and effect in their relationships, 4) Where in the customer life cycle are specific events such as increasing purchases, giving referrals or becoming unhappy more likely to happen, 5) How to balance value given to customers with value received from customers, so that the businesses and their customers profit but not at the expense of the other, 6) Where the brand recognition stands in relation to others in the marketplace, 7) What efforts will be required to reach the business objectives, 8) What are the realistic expectations of the business, in addition to identification of problem areas, opportunities for growth, etc.

9) How to run a sustainable business,

10) Who are the most profitable customers, what are their relationships worth,

11) What is the key source of revenue, and

12) How to optimize the key source of revenue to maximize profit flows.

In one embodiment, to increase Profit Flows, management understands how their relationships as well as strategic marketing works so they can integrate strategic marketing concepts across the Front Office and define the metrics that measure the performance of the business. To determine the root causes that hinder the profitability of the business, management evaluates and understands with specificity the functional responsibility of the Front Office (i.e. Marketing, Sales and Customer Care), and potential actions that can improve the inter-working relationships of functional organizations to improve profitability and reduce risks. Management also understands how these groups are integrated in the Front Office, how the inter-working relationships of functional organizations affect their prospects and customers, and how to use the resources of people, time and money to their best advantage. Additionally, it is beneficial for management to share the strategy and results with everyone in the Front Office, ensure that the Front Office is integrated, further ensure that the outputs of their efforts are accessible and easily understandable, and that the output is organized to quantify, categorize and analyze it to help the performance of the business. The process helps to quickly capitalize on the strength of the business by not only making informed adjustments to the marketing program, but by making strategic, long-term investments.

To begin to solve the problems, the Front Office organizes around the customer by dividing the major process steps into detailed steps that can be implemented and measured, assigning a value to the detailed steps (or Interactions) and thereby the relationships, modeling strategies in advance of investment, anticipating the metrics, implementing a most promising strategy out of all possible strategies and options, tracking the results, analyzing the results, and developing leading indicator metrics.

The Difficulty of Optimizing the Front Office with Current Approaches

Without the necessary Business Intelligence, management doesn't use marketing resources effectively and efficiently, doesn't know where to allocate marketing budgets and neglects of the source of profit flow, their customers. It's common for executives to think of marketing as a black hole or for them to moan that they know that only half of their marketing is working, but that they don't know which half. It is also common for executives to spend much more on acquiring customers than keeping them.

Management has been stymied in evaluating performance of Front Office marketing strategies for three reasons:

1. The available metrics are typically based on individual tactics in either Marketing, Sales or Customer Care, a symptom that these departments are not working together.
2. Extraneous data has made it difficult to know what is intelligent and actionable and what is not. Systems to capture data have been built by Information Technologists or accountants—not by those experienced in the workings of the Front Office.
3. It has been onerous to capture the necessary implementation detail to back up high level assumptions, resulting in bad intelligence.

A Customer-Centric Solution Needed

How marketing works is not readily understood for three reasons.
1. To understand how marketing works, it is necessary to know how effective customer relationships work. Management has imperfect information since it has focused on what their company is selling rather than on what their customers are buying.
2. With this internal focus, metrics associated with tactical, or operational, efficiency have dominated marketing strategy, management and measurement.
3. Lack of Business Intelligence on building effective customer relationship makes it difficult to quantify relationships to mitigate risk and maximize profit flows.

Business Intelligence is needed on the cause and effects of customer interactions and on relationship-driven strategy determination and implementation. Quantifying and monetizing the customer relationship are key to maximizing profit flows.

Description of the Solution

This Marketing Business System (MBS) is designed to deliver the Business Intelligence management needs to build relationships and thereby profit flows.

The MBS configures a Relationship Tracking System as an Analytical Framework to develop leading indicator metrics baselines including scoring the relative market position of the business and quantifying Front Office strategy and relationship performance.

The efficacy of a high level Customer LifeCycle Profitability Model for Status Quo and a new marketing strategy developed during the planning process is checked during implementation with lower level Interaction data collected in the Relationship Tracking System. This foundation of lower level data helps to make high level assumptions more reliable in future iterations.

The datastream from the Relationship Tracking System also makes it possible to capture customer behavior patterns, showing the cause and effect of customer relationships, Interaction by Interaction as well as the pattern punctuated by the major events or milestones in the customer life cycle and finally appending these behavior patterns with Awareness/Satisfaction Research findings to correlate movements.

How customer relationships work is key to how marketing works. When management knows how it works for their company, they can use their marketing resources more wisely to acquire new customers and strengthen their relationships with their existing customers. Over time, as the marketing formula is refined, management can maximize profit, mitigate risk and hone their business model.

The primary benefits of the business process to management is guidance in mitigating risk and maximizing profit flows. Higher profitability leads to greater value in the marketplace. Greater value in the marketplace translates to more shareholders, increased stock value, higher sale value. Higher profitability can be used to build a long-term viable business, give dividends, make acquisitions, pay down debt and do public good. Information from the business process can balance short-term and long-term goals or be stronger in either direction. The information gives management options.

Secondary benefits are knowing where to focus, setting realistic expectations and attaining an integrated Front Office. The integrated Front Office comes with its own set of ancillary benefits—Marketing, Sales and Customer Care working together, aligned behind a common Marketing Strategy, with everyone owning the customer—and management knowing what everyone does at what cost.

Long-term benefit is deep knowledge of customers and customers' value that enables a business to differentiate based on exclusive customer relationships.

From the 19 reports the business process creates there is a plethora of information. Each business has a unique set of circumstances and unique needs for leading indicator metrics to guide management. Evaluating which metrics will really be helpful is done up front. As circumstances change, different metrics are highlighted. The Report Grid summarizes the purpose of the reports and how they contribute to the benefits to be derived from the MBS. The Report Grid also indicates at what stage they are used in the MBS, for establishing the status quo baseline, planning an alternative strategy or evaluating results of strategy implementation. The Report Grid is in Appendix E, E-44 to E-47.

With this proprietary information, management can hone the business model to mitigate risks and increase profit flows and repeat the business process steps as necessary to improve on the leading indicator metrics to build a database of more proprietary information for future reference.

FIG. 1 is a simplified database architecture diagram of a Marketing Business System (MBS) 10 including a server sub-system 12 and a plurality of client sub-systems 14 connected to server sub-system 12. MBS 10 tracks information and provides a status to users upon request. In one embodiment, client sub-systems 14 are computers including a web browser, such that server sub-system 12 is accessible to client sub-systems 14 via the Internet. Client sub-systems 14 are interconnected to the Internet through many interfaces including a network, such as a local area network (LAN) or a wide area network (WAN), dial-in-connections, cable modems, special high-speed ISDN lines, DSL and T1 lines. Client sub-systems 14 could be any device capable of interconnecting to the Internet including a web-based phone or other web-based connectable equipment. A database server 16 is connected to a centralized the database containing product related information on a variety of products, as described below in greater detail. In one embodiment, the database is stored on database server 16 and can be accessed by potential users at one of client systems 14 by logging onto server system 12 through one of client sub-systems 14. In an alternative embodiment the database is stored remotely from server sub-system 12.

The MBS utilizes a network-enabled (e.g., Web-enabled) interactive database to automate a Marketing Business System. System 10 captures pertinent information and provides on-line, up-to-date information to the user, whether corporate or individuals, after authentication, upon request. In one exemplary embodiment, system 10 utilizes a database with a client user interface front-end for administration and a network interface for standard user input and reports. Information is accessed in the database through a variety of analytical tools. The MBS is a marketing tool to facilitate Strategic Marketing and Business Intelligence Consulting. The MBS can also be used as a stand alone tool for internal users.

System 10 supports various levels of management hierarchy and provides access to individuals based on the position held by the individual within the business entity.

Figure 2:
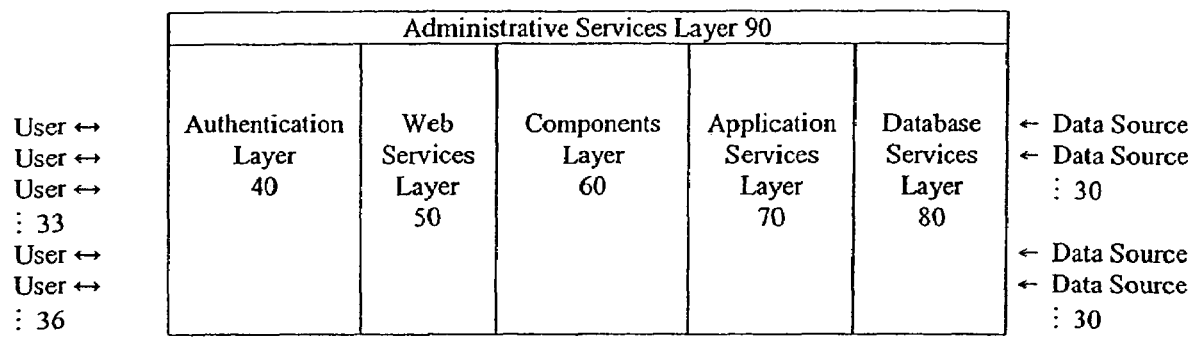
FIG. 2 shows an alternative embodiment of the database architecture shown in FIG. 1, a N-Tier Architecture Overview configuration for database services.

FIG. 2 shows a configuration of database services 80 within an N-Tier Architecture as an alternative approach to the architecture described in FIG. 1 and is another embodiment of MBS 10. An N-Tier Architecture allows an unlimited number of programs to run simultaneously, send information to one another, use different protocols to communicate, and interact concurrently.

In an exemplary embodiment MBS 10 utilizes a database services 80 to collect and store information on individuals important to the success of the business entity. MBS 10 tracks contact information as well as an ongoing Interaction Record of various ways individuals interact with the business, and how each interaction affects the profitability by quantifying the effort in various ways. The information is sorted into several user interfaces from preliminary to a formal analysis for profiling purposes. The Interaction Record itself is kept in tabular form (instead of the usual running dialogue of contact management systems) so that the record can be quickly read or analyzed. Database services 80 are divided into several sections, which are further divided into a variety of subsections to organize and store the data relevant in the analysis and reporting. Various sections within database services 80 are interconnected to update and retrieve the information as required.

In the embodiment in FIG. 2 of an N-Tier Architecture, database services 80 receive data from a variety of data sources 30 and feed data streams 32 to a similar variety of data sources. Users access the searchable database services 80 a variety of ways through a browser on a network 33 or directly from a computer 36. Users input and output data.

Database services 80 are coupled to several layers within the N-Tier Architecture, which perform specific tasks. All the layers are integrated to provide comprehensive information. Updating information within one section also automatically updates the relevant information in other sections of the database to maintain integrity.

The first layer that a user 33 or 36 encounters is an authentication layer 40 which determines whether the user is to be granted access and what level of access to database services 80. Users 33 also go through a web services layer 50 which is a necessary interface for those seeking to access database services 80 through a browser. A components layer 60 houses the business rules for specific tasks including, but not limited to the business rules for access. An application services layer 70 does the process of the business rules, doing the tasks necessary to provide the MBS 10 System and the user with the data formatted or requested. The database services layer collects and houses the data in a variety of analytical formats including, but not limited to lists, spreadsheets, cubes, etc. An administrative services layer 90 provides the utilities and oversight to make the layers work together to provide the data and reports MBS 10 and the user require in pre-determined formats. System 10 is flexible to provide alternative reports and is not constrained to the options set forth above.

The systems and processes are not limited to the specific embodiments described herein. In addition, components of each system and each process can be practiced independent and separate from other components and processes described herein. Each component and process also can be used in combination with other components and processes.

Overview of Terminology:

For the purposes of explanation, a brief overview of terminology is provided hereunder:

1) Strategic Brand Readiness (SBR) Factor

The SBR factor is a method to more accurately portray value and mitigate risk posed by external and internal brand readiness issues. The SBR factor allows the business to reflect relative market position as a planning tool.

Typically Net Present Value (NPV) assigns a risk factor at a flat percentage, usually the same figure as the current interest rate, so if the interest is 10%, then risk is 10% and the NPV factor is 20% for the first year. The SBR factor goes beyond NPV and adjusts anticipated profit upwards for brands that are ready and have a favorable market situation and adjusts anticipated profit below the value of the flat percentage for brands that aren't ready and that are facing a more uncertain market situation. The SBR factor range is + or −10%. Typically the NPV risk flat percentages are 10%. The SBR factor fluctuates to show aftereffects of programs put into place in year one.

The overall SBR factor includes two parts. One part includes six categories and evaluates the external market situation. The other part includes an additional six categories and evaluates what can be done or is being done to affect it. There are 100 possible points spread among the categories that matter in an Acquisition phase, a different set of 100 in a Closing phase and still a different set of 100 in a Retention phase. The SBR factor value is portioned 20% to the Acquisition phase, 30% to the Closing phase and 50% to the Retention phase to reflect a typical breakout of new to repeat business and to arrive at a final SBR factor in the range of + or −10%. Included within the 12 possible categories are 70 individual items in total. The value can be different in each phase and a full value is preset. Each item has 5 possible choices for scoring and a relative value: 1, 0.5, 0, 0.5, and −1. The score is figured by multiplying 1, 0.5, 0, −0.5, and −1 times the full value of the item. The sum of the relative value of all the items in a category as scored determines the value that category contributes to the SBR factor for each of the phases. The objective of undertaking SBR analysis is to arrive at a factor unique to the specific business situation that the business can utilize to make future forecasts.

The full value preset for the items and the categories can be changed for every industry or product service offering. Even different categories and items can be created and have different full values preset. For example, in some industries, innovation may have more impact than in others and therefore be assigned a higher value. The process requires the user to be consistent once the values are assigned and use the same values in comparing strategies from year to year. The SBR factor scoring potential averages the opinions of a panel of subject matter experts as a starting point for preset values.

Remedies can be directed to the category overall or to an item within the category. (Example: "Must Haves" is a category. Quality is an item under that. Excellent quality is worth a 1; good, −0.5; poor, no value; questionable, 0.5; and unknown, −1. There are 7 items under the "Must Haves" category and each will be rated and counted in the category value.) The business may make investments to increase the value. Investments may include, for example, changing manufacturing processes to improve quality, adding human resources to improve the track record in an area, lowering prices to increase market share or customer share, investing in technology to make the product more integral to the customer's business adding more financial resources to Travel & Entertainment budget for aggressive, networking, investing in a privacy program to increase the trust factor, or initiating a long-term public relations program to change the reputation.

2) Customer LifeCycle Profitability Model

The Customer Lifecycle Profitability Model takes a snapshot of a customers' entire life cycle to give a comprehensive view of their value, given a particular set of circumstances and assumptions. The model is used for each of a variety of strategies and best and worse case scenarios, starting with the status quo, to compare the value of one strategy to another in advance of investment and to maximize profit flows.

The Customer LifeCycle Profitability Model supplemented by an Interaction ROI Model is used to help quantify Front Office strategy and relationship performance to compare past performance with assumptions about anticipated future performance and actual future performance.

To provide information for the model, management completes a Customer LifeCycle Profitability Model Template (Shown in Appendix E, pages E-5 through E-7) for Status Quo best and worst case scenarios and two alternative Marketing Strategies with best and worst case scenarios. The information includes Front Office and financial data as well as the appropriate SBR Factor and management's assumptions for performance given the various strategies.

The Customer LifeCycle Profitability Model presents the results for comparison in the Customer LifeCycle Profitability Model Alternative Strategies Scenario Comparison, organized by Status Quo Best and Worst Case, then Alternative #1 Best and Worst Case, followed by Alternative #2 Best and Worst Case. Once management commits to a particular strategy and before implementation of that strategy, the Customer LifeCycle Profitability Model is double checked by looking at tactical requirements and assumptions in more detail in a Planning Mode Interaction ROI (I ROI) model that mirrors the format of the data that will come from the tracking system. Adjustments are made in the new marketing strategy Customer LifeCycle Profitability Model as needed. The combination of the anticipated metrics in the Customer LifeCycle Profitability Model and the I ROI Models form the baseline for future analysis of success in implementation.

Upon implementation, data from the tracking system feeds a Tracking Mode I ROI model which is the basis for a series of management reports yielding leading indicator metrics that allow for informed, focused adjustments to maximize profit and to be more effective in building relationships.

One of the management reports is a Customer LifeCycle Profitability Model Summary Report. The I ROI Model provides data to the Customer LifeCycle Profitability Model which runs this report. The report is used to evaluate the actual success of the chosen strategy compared to plan and status quo. It summarizes key assumptions leading to forecast. It compares anticipated long-term profitability of an individual customer and the business overall, adjusted to reflect the risk and the value of future dollars, and the cost in up front financial commitment.

The Customer LifeCycle Profitability Model value is derived by (1) looking at all the ways revenue comes in—from existing customers, new customers without referral, referred customers, and repeat business multiplied by the average yearly sale; (2) accounting for all the costs in detail for the Back Office and Front Office including direct costs (incremental and fixed), investments in infrastructure and Brand Readiness; and (3) using the SBR factor to more accurately portray value and risk than can be done using Net Present Value (NPV) discounts alone. The cumulative NPV profit shows the profit anticipated for the entire customer base. Customer Lifetime Value profit reduces it to the individual customer to show the net present value of future profits to be received from the average customer gained in year one over a period of several years. Customer Lifetime Value is typically used to justify discrete investments or separate Marketing, Sales, or Customer Care programs, and not to justify an Integrated Market Action Program (IMAP) that serves the entire Front Office as does this process.

In fact, business can develop an even more comprehensive Customer LifeCycle Profitability Model by accounting for multiple Sales Channels, products/services and pricing structures, marketing programs for alternative Acquisition and Retention strategies operating simultaneously or primary as well as secondary relationships. For example, the business can anticipate how investments in programs with non-customer groups, such as partners, analysts, employees, referral sources, and internal and external influencers, could change results with customer groups. Similarly, the business can develop a less comprehensive Customer LifeCycle Profitability Model by evaluating the effect of only one element compared to the status quo, for example, the effect of adding technology to change infrastructure.

The Customer LifeCycle Profitability Model can also be developed by evaluating the impact of segregating the business into various smaller business divisions, brands, and geographic contingencies. The Customer LifeCycle Profitability Model can be further segmented into customers by product family, industries, sources, various rating schemes, and more. The Customer LifeCycle Profitability Model is adaptable to any accounting system. The model can use net profit or gross profit or use overhead costs to get to average profit instead of marginal profit with all related investment costs added. The usefulness of the model is dependent, at least in part, on consistency.

3) Customer Segmentation

In one embodiment, to meet business objectives while increasing profit flows, a business focuses on customers that are already profitable customers or are otherwise priority customers. In an alternative embodiment, a business focuses on customers that are already the business' most profitable customers or are otherwise top priority customers. The business also focuses on prospective customers who have similar profiles to top priority customers. The prospective customers are referred to as prospects. Because profit is more likely to flow from satisfied customers, the business process encourages businesses to focus on creating customers for life. For example, extremely satisfied customers are more likely to be repeat customers, increase the amount they purchase or purchase new offerings more easily, eliminating the cost of Acquisition and lowering the cost of Closing. Extremely satisfied customers are also more likely to refer new customers, lowering Acquisition costs.

The priority customers for each business will be defined differently. Several factors that are considered by businesses in identifying and focusing on priority customers include, but are not limited to, profit, large purchase volume, good cash flow, promptness in paying, prestigious customers, or key customers in a new industry or geographic location.

The businesses take advantage of currently available cross tab analysis, Recency/Frequency/Monetary (RFM) transactional analysis, neural networks and other techniques to segment the most profitable (or otherwise priority) customers and to find other potentially profitable (or otherwise priority) customers within their customer base and in the marketplace in general.

4) Targeting Research

Targeting Research is customer-centric research that goes beyond product- or company-centric research to drill down deep enough to know why people do what they do, or what they are likely to do. Targeting Research uncovers nuances used to differentiate products or services in the marketplace and increase the likelihood that the customer will respond to the Integrated Market Action Program (IMAP).

The main reasons for undertaking Targeting Research are to confirm the market situation, validate viability of business objectives and customer segmentation, and determine the offering's appeal to potential top priority customers. Its results can help redefine what is being sold, why anyone cares, and who cares the most. Positioned correctly, targeting research can develop initial prospects and influencers for the business.

There are a couple of approaches, depending upon the number of prospects and customers and the number of customer segments in the overall target market.

For less than 100 prospects and customers in the overall target market, the business has an outside resource that calls upon approximately 25 people for in-depth one-on-one thorough telephone interviews, transcribes the interviews and analyzes these interviews.

For more than 100 prospects and customers in the overall target market, the business has an outside resource that interviews approximately 12 people in-depth to obtain the issues, then conducts more extensive discussions to validate the issues and identify nuances. If there are a number of distinctly different customer segments, the outside resource will interview with more customers in-depth, up front. The process continues depending on the overall size of the target market and the number of segments, until approximately 100 to 500 people are surveyed in depth. The business utilizes an outside resource to analyze the survey data using cross-tabulations that look at how different segments of the prospects or customers answered the questions. For example, women versus men, more profitable customers versus less profitable customers, the people with one set of products versus another and so on. From these results, the businesses build a profile of their best prospects and best customers so that the businesses can appeal to them more directly.

5) Targeting Research Options

While cross-tabulation analysis is adequate for most Targeting Research assignments, there is an occasional need for conjoint analysis. Under conjoint analysis, prospects or customers are given a series of options to rank with the goal of determining the optimal offering. Results of this analysis form the basis of a market model that can be reused as the offering evolves. Similarly, decision analysis models can be built to help prioritize offerings and/or projects.

On occasion a focus group may be used to clarify an issue. If the product/service needs to be demonstrated, a series of focus groups can be invaluable. If the product/service can be self-demonstrated, a self-administered survey is another option.

6) Front Office Process including Acquisition, Closing & Retention

The Front Office Process refers to a process for managing a Front Office that works well for the customer and the business. Understanding how it works, or how it should work, is beneficial to understanding any problems that should be solved to market to priority customers to increase profitability.

To work for the customer, it is beneficial for the people in the Front Office to work together to provide a seamless experience for the customer, from what is promised to what is delivered. In this business process, the Front Office is integrated without destroying the separate tactical functions of Marketing, Sales and Customer Care. Instead the distinct and different skills of the people in Marketing, Sales and Customer Care are focused on what they do best with clear handoffs between the functions and appropriate collaboration to work with the customer.

In the business process, the Front Office is organized around customers (and prospective customers or prospects) and their experiences regarding the Acquisition/the Closing/ and the Retention (A/C/R) Phases. Marketing is charged with the Acquisition and hands off to Sales once a prospect becomes promising. Sales is responsible for Closing and handing the prospect off to Customer Care once the prospect becomes a customer. The hand off to Customer Care is an extended period since the purchase is arranged, but the customer has not received the purchase. Sales stays intimately involved to make sure the customer gets what has been promised and that introductions to Customer Care go smoothly. The Sales and Customer Care Staff form a customer relationship team and are activated again for repurchases. During the period between purchase and repurchase, Customer Care handles Retention activities. In fact, in the Customer Life-Cycle Profitability Model and in the Interaction ROI (I ROI) Model, the Closing is segregated as Closing (Initial) and Closing (Repeat) to explore both metrics. To help evaluate the Retention Value, the Customer Maintenance Level is scored for inclusion on the Knowledge Screen Relationship Value (FIG. 53) drawing on customer service/technical support records.

The A/C/R Phases are further divided into CELs (Contact Evolution Levels) and how the process works now is looked at from the CEL perspective using the CEL framework to see what changes would need to be made to integrate the functional areas. What it takes for a contact to be in or achieve a CEL Level is defined for the business at this point. If the Front Office process is working well, the business gains by having the Front Office aligned behind one Marketing Strategy and by having the proper level of awareness, leads and satisfaction to keep suspects (a phase before the potential customer is classified as a prospective customer), prospects and customers flowing through the A/C/R Phases and corresponding CELs. Looking at awareness, leads and satisfaction or the lack thereof, is another way of defining the problems to be solved. In fact, a SWOT (Strengths, Weakness, Opportunities, and Threats) analysis on all aspects of the Front Office process is performed to understand the process strengths and weaknesses. The key issues involved in SWOT analysis relates to the process itself, (i.e. what does it take to move people from one CEL to another), how customers are affected by the process (i.e. what the business promises, delivers and the business' reputation in the selling environment) and what the business gains from having conducted the process (i.e. awareness, leads, satisfaction).

7) Strategic Positioning

Strategic Positioning is the bridge between a business and its customers. Strategic Positioning ensures there is not a disconnect between the business' overall strategic plan and its customers' experience, including their expectations or acceptance of the business' place in a competitive marketplace.

Strategic Positioning is the foundation of Marketing Strategy. It is expressed as a Strategic Positioning Statement and as a Promotional Positioning Line. It is augmented by Key Messages and Supporting Facts. It does not necessarily include the Value Proposition, defined as the delivery of the major benefit.

Strategic Positioning analysis draws on the strategic plan of the business, the knowledge gained from Targeting Research and competitive research. The analysis determines what the marketing openings are, or are not, by overlaying on management's perspective of the business' Value Proposition and its Key Messages, the perspective of its customers and the competition. The Strategic Positioning analysis optimizes the marketing opening a business may have by showing where it is going to be easier to be heard, where a perception may need to be changed, and what is going to take a larger effort to achieve, if it can be done at all.

The Value Proposition is the reason that management thinks the customer should value its offering and is the most likely reason customers stay, but not necessarily the reason they become customers.

A Strategic Positioning Statement summarizes what the business is, what it stands for, what it has to offer, to whom and why they should care (the major appeal of the offering). The Strategic Positioning Statement further summarizes the differences between the business and its competitors.

A Promotional Positioning Line highlights what is most likely to appeal to the customer about the offering.

Key Messages build upon the Promotional Positioning Line and add other pertinent information including information that may lead the customer to understand the Value Proposition. Over time, the Value Proposition can become the reason customers become long time customers, if, in fact, it was not the reason to begin with. Supporting facts lend credibility and proof of performance.

8) Marketing Strategy

Marketing Strategy flows from Strategic Positioning to balance risk and profit with the market situation, the capability of the business, its resources, and its objectives. Strategic Positioning links a business to its customers. In fact, it is the customer relationship that drives Marketing Strategy in this business process. A relationship with a customer is built one interaction or experience at a time. Because the cause and effects of customer interactions are not well understood, marketing has been difficult to justify or hold accountable. Quantifying and monetizing the customer relationship are key to increasing profit flows. In identifying alternative marketing strategies, the business process places greater importance on the interactions with customers (and prospective customers) than other aspects of marketing.

While interactions with the customer drives Marketing Strategy in this business process, pricing, distribution, and the offer are not ignored. They are aligned with the relationship aspect and support the Strategic Positioning. Assumptions of the affects of alternative pricing, sales channel choices and product configurations (including customer service and technical support) on revenue and costs are summarized in the Customer LifeCyle Profitability Model and in the Interaction ROI Model.

Figure 3:
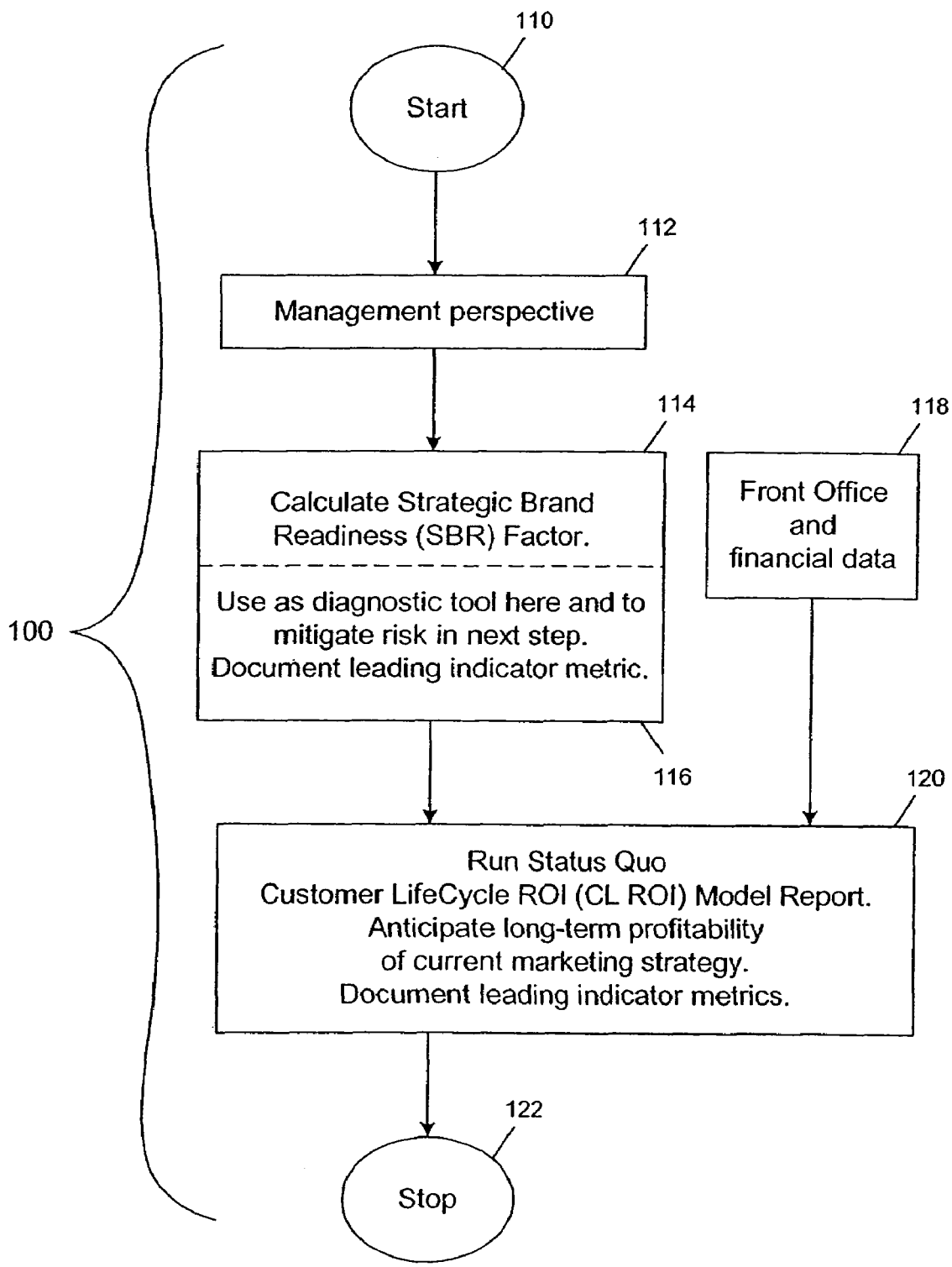
FIG. 3 is an exemplary embodiment of a flow chart detailing a process to quantify marketing status quo.

FIG. 3 is an exemplary embodiment of a flow chart 98 detailing a process 100 to quantify marketing status quo. Marketing status quo refers to a present condition of a business from a marketing perspective. Process 100 is typically started 110 by establishing a base line, which can later be compared to determine the actual progress made in a business's profitability. Process 100 generates reliable results when there is an understanding of management perspective 112 through face to face meetings and round table discussions. Based on the acquired information, Strategic Brand Readiness (SBR) Factor is determined 114 and Leading Indicator Metrics are documented 116. Based on the information received 118 from the Front Office and Financial Performance data 118 of the business, a Status Quo Customer Life-Cycle Profitability Model report is run 120 to anticipate long term profitability. Leading indicator metrics are also documented based on the Customer LifeCycle Profitability Model report. The metrics and the Customer LifeCycle Profitability Model report form the base line which is later compared against future data after newly revised strategies are implemented to understand the effectiveness.

Figure 4:
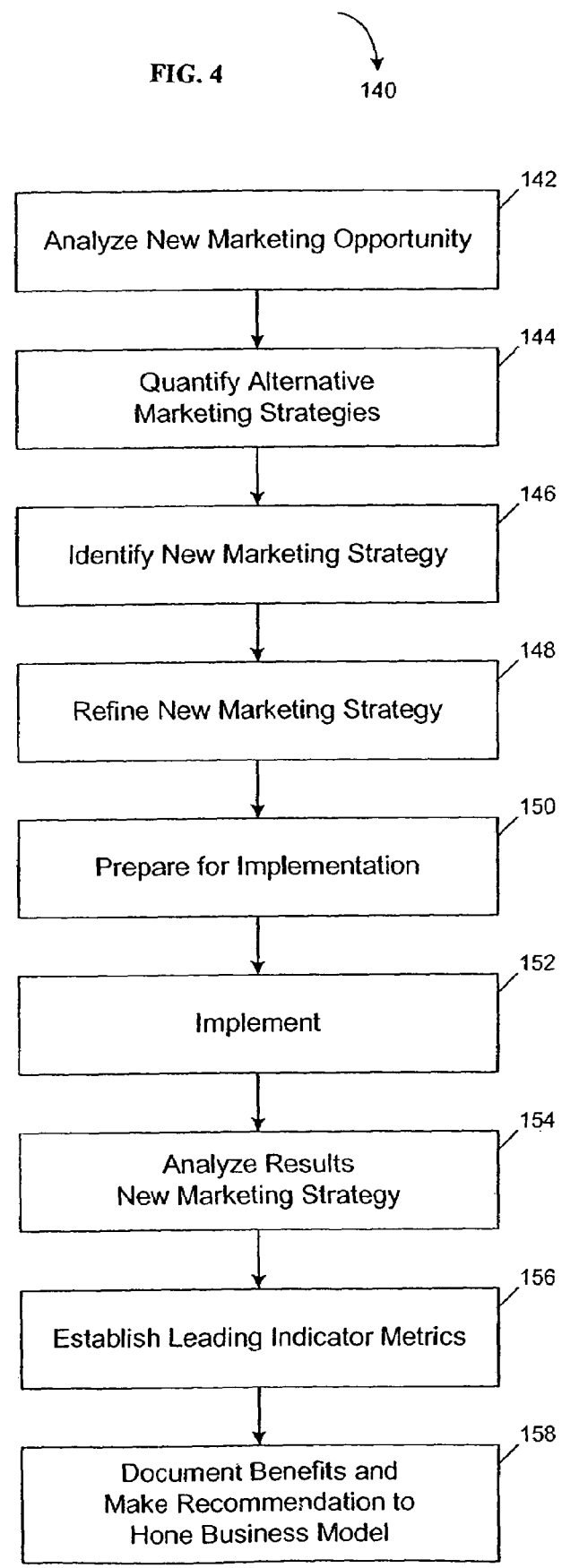
FIG. 4 is an exemplary embodiment of a flow chart detailing an iterative process that reduces the risks and maximizes profit flow for the business.

FIG. 4 is a flow chart detailing a revised process 140 that reduces the risks and increases profit flow for the business. Process 140 includes Analyzing 142 New Marketing Opportunity, Quantifying 144 Alternative Marketing Strategies, Identifying 146 New Marketing Strategy, Refining 148 New Marketing Strategy, Preparing 150 for Implementation, Implementation 152, Analyzing 154 Results of New Marketing Strategy, Establishing 156 Leading Indicator Metrics, and Documenting 158 Benefits and Making Recommendations to Management based on analysis of results to hone the Business model to mitigate risks and maximize profits.

Figure 5:
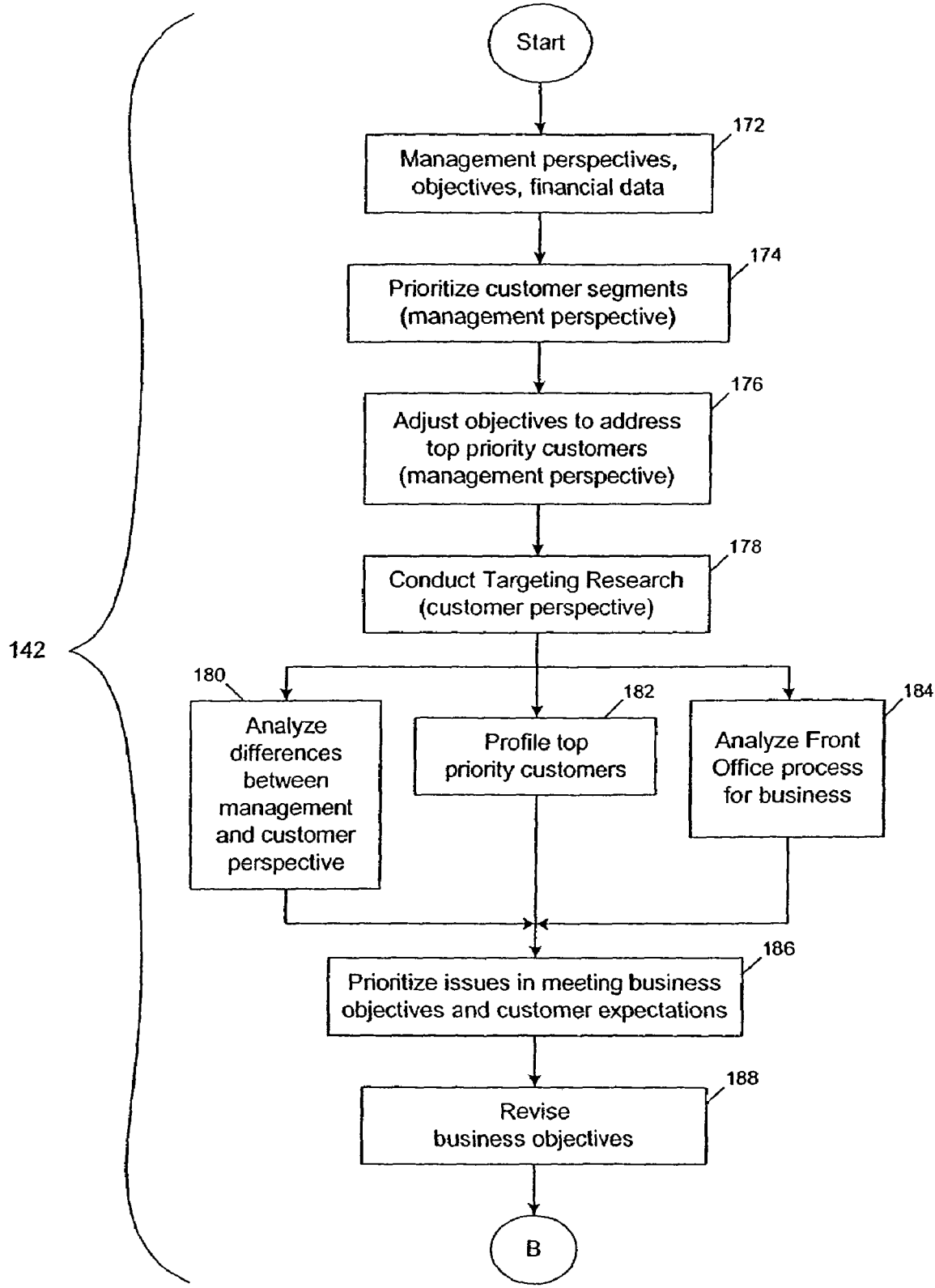
FIG. 5 is an exemplary embodiment of a flow chart detailing the step of Analyzing New Marketing Opportunity shown in FIG. 4.

FIG. 5 is a flow chart 170 detailing the step of Analyzing 142 New Marketing Opportunity (shown in FIG. 4). Analyzing 142 New Marketing Opportunity includes understanding 172 management perspective through face-to-face meetings and round table discussions and prioritizing 174 customer segments. Business objectives are adjusted 176 to address top priority customers and targeting 178 research to identify a specific group of customers is undertaken. Analyzing 180 differences between management and customer expectations, profiling 182 top priority customers, and analyzing 184 Front Office process of the business help identify issues in meeting business objectives and customer expectations. Once the issues are identified, the issues are prioritized that have been determined to be important in meeting business objectives and customer expectations. If applicable, business objectives are revised 188.

Figure 6:
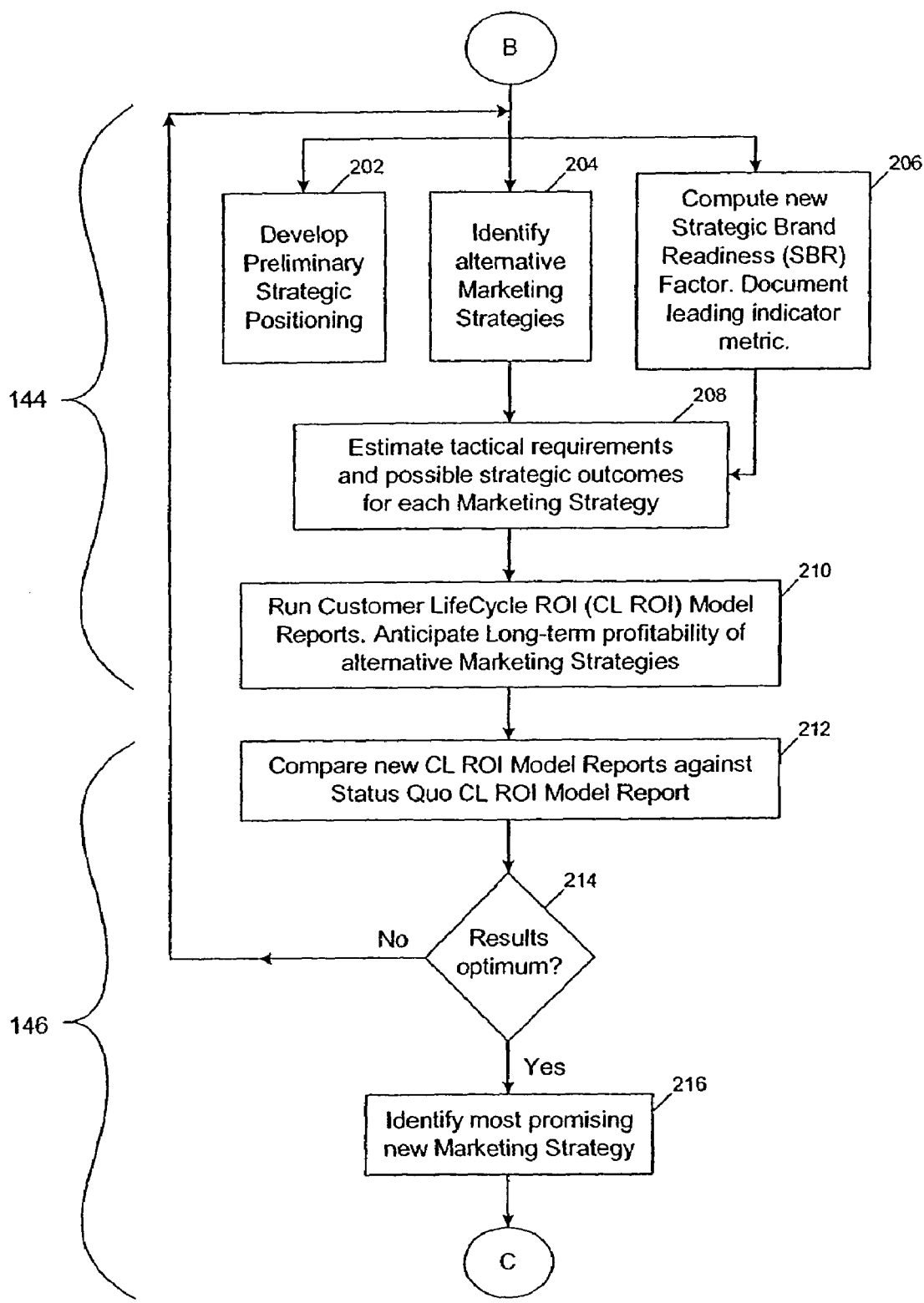
FIG. 6 is an exemplary embodiment of a flow chart detailing the steps of Quantifying Alternative Marketing Strategies and Identifying New Marketing Strategy shown in FIG. 4.

FIG. 6 is an exemplary embodiment of a flow chart 200 detailing the steps of Quantifying 144 Alternative Marketing Strategies and Identifying 146 New Marketing Strategy (shown in FIG. 4). Quantifying 144 Alternative Marketing Strategies requires developing 202 preliminary strategic positioning, identifying 204 alternative marketing strategies, and computing 206 a new SBR factor together with documenting leading indicator metrics. Tactical requirements are estimated 208 with possible strategic outcomes for each specific marketing strategy. The user anticipates long-term profitability of alternative marketing strategies after analyzing the results obtained from a Customer LifeCycle Profitability Model Report 210. To identify 146 a New Marketing Strategy, the user compares 212 new Customer LifeCycle Profitability Model report against the Status Quo Customer LifeCycle Profitability Model report and analyzes 214 the results for an optimum condition. If the results are optimum, a most promising marketing strategy is identified 216. If the results are not optimum, the user may repeat 202 through 214 to provide optimum results.

Figure 7:
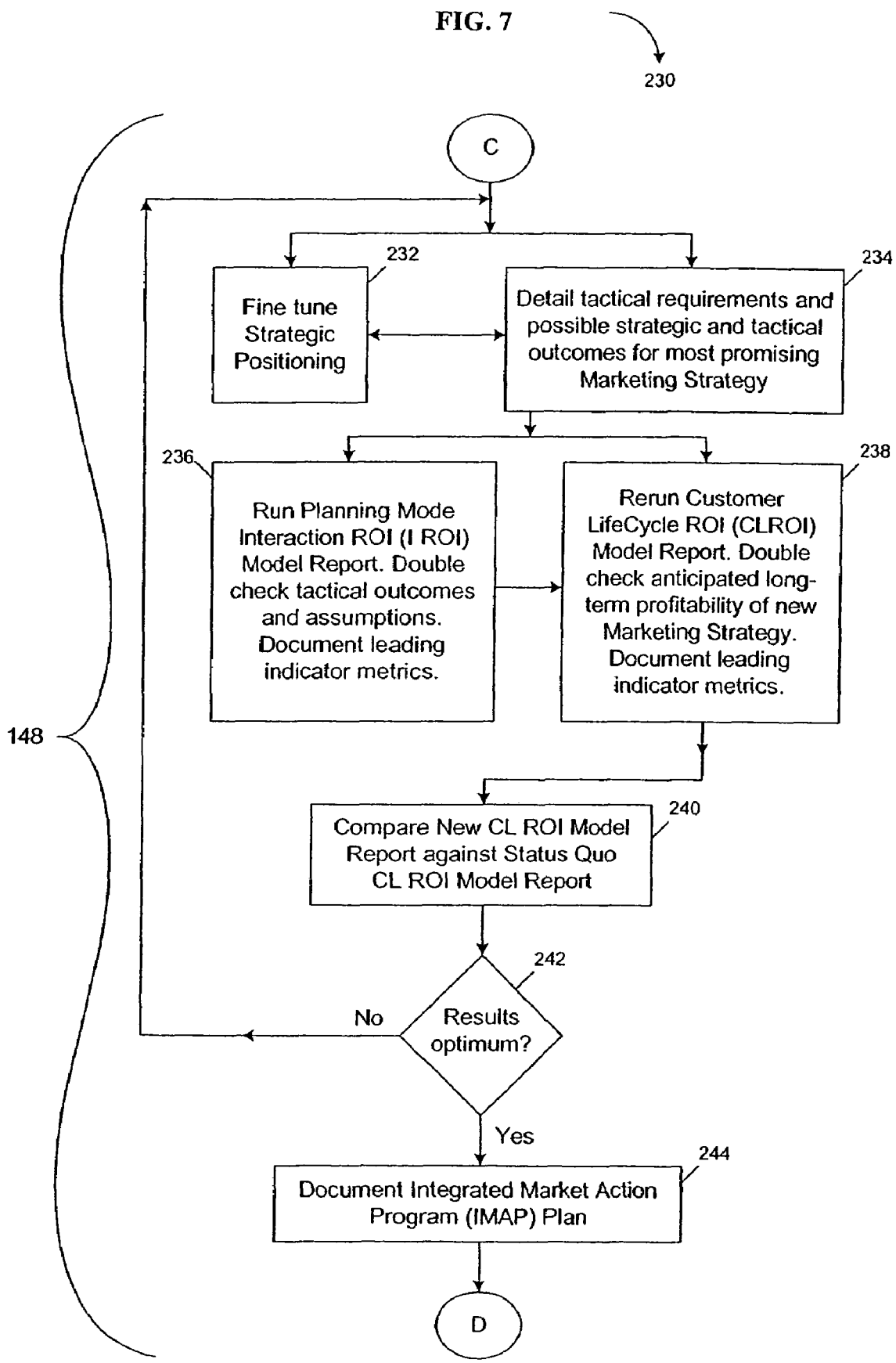
FIG. 7 is an exemplary embodiment of a flow chart detailing the step of Refining New Marketing Strategy shown in FIG. 4.

FIG. 7 is an exemplary embodiment of a flow chart 230 detailing Refining 148 New Marketing Strategy (shown in FIG. 4). Refining 148 New Marketing Strategy includes fine tuning 232 strategic positioning and detailing 234 tactical requirements as it relates to a new marketing strategy. Planning mode interaction ROI report is run 236. Simultaneously, tactical outcomes and assumptions are checked for accuracy and leading indicator metrics are documented. Based on the revised information, Customer LifeCycle Profitability Model report is run again 238 to validate assumptions. To Refine 148 New Marketing Strategy, the user compares 240 new Customer LifeCycle Profitability Model report against the Status Quo Customer LifeCycle Profitability Model report and analyzes 242 the results for an optimum condition. If the results are optimum, an Integrated Market Action Program (IMAP) Plan is documented 244. A sample of an IMAP Plan outline is attached herewith in Appendix-A. If the results are not optimum, the user may repeat 232 through 242 to provide optimum results.

Figure 8:
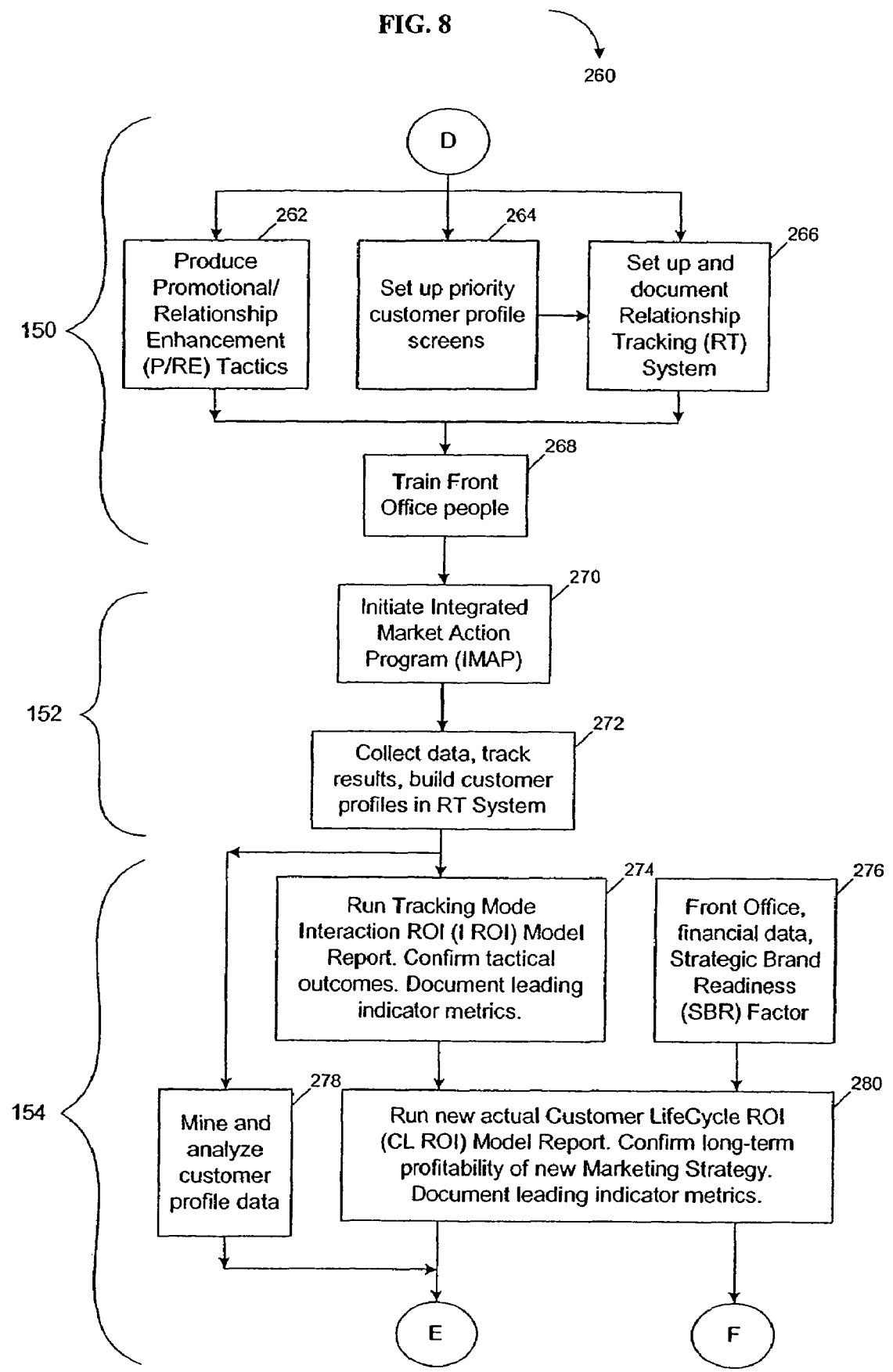
FIG. 8 is an exemplary embodiment of a flow chart detailing the steps of Preparing For Implementation, Implementation, and Analyzing Results of New Marketing strategy shown in FIG. 4.

FIG. 8 is an exemplary embodiment of a flow chart 260 detailing Preparing 150 For Implementation, Implementation 152, and Analyzing 154 Results of New Marketing strategy (shown in FIG. 4). Preparing 150 For Implementation includes producing 262 promotional/relationship enhancement tactics, establishing 264 priority customer profiles and establishing and documenting 266 Relationship Tracking (RT) system. Once 262, 264 and 266 are completed, the individual responsible for the front office trains 268 front office personnel for implementation 152. During part of implementation 152, IMAP is initiated 270, customer profiles in RT system are built, data is collected and results pertaining to implementation are tracked 272. Analyzing 154 Results of New Marketing strategy includes initiating and completing 274 through 280 (described below). A Tracking Mode Interaction ROI model report is run 274 to confirm tactical outcomes and document leading indicator metrics. Information, such as Front Office data, financial data and SBR factor is obtained 276 and customer profile data is mined and analyzed 278. In addition, a new Customer LifeCycle Profitability Model report is run 280 to confirm long-term profitability of the new marketing strategy. Leading indicator metrics are also documented.

Figure 9:
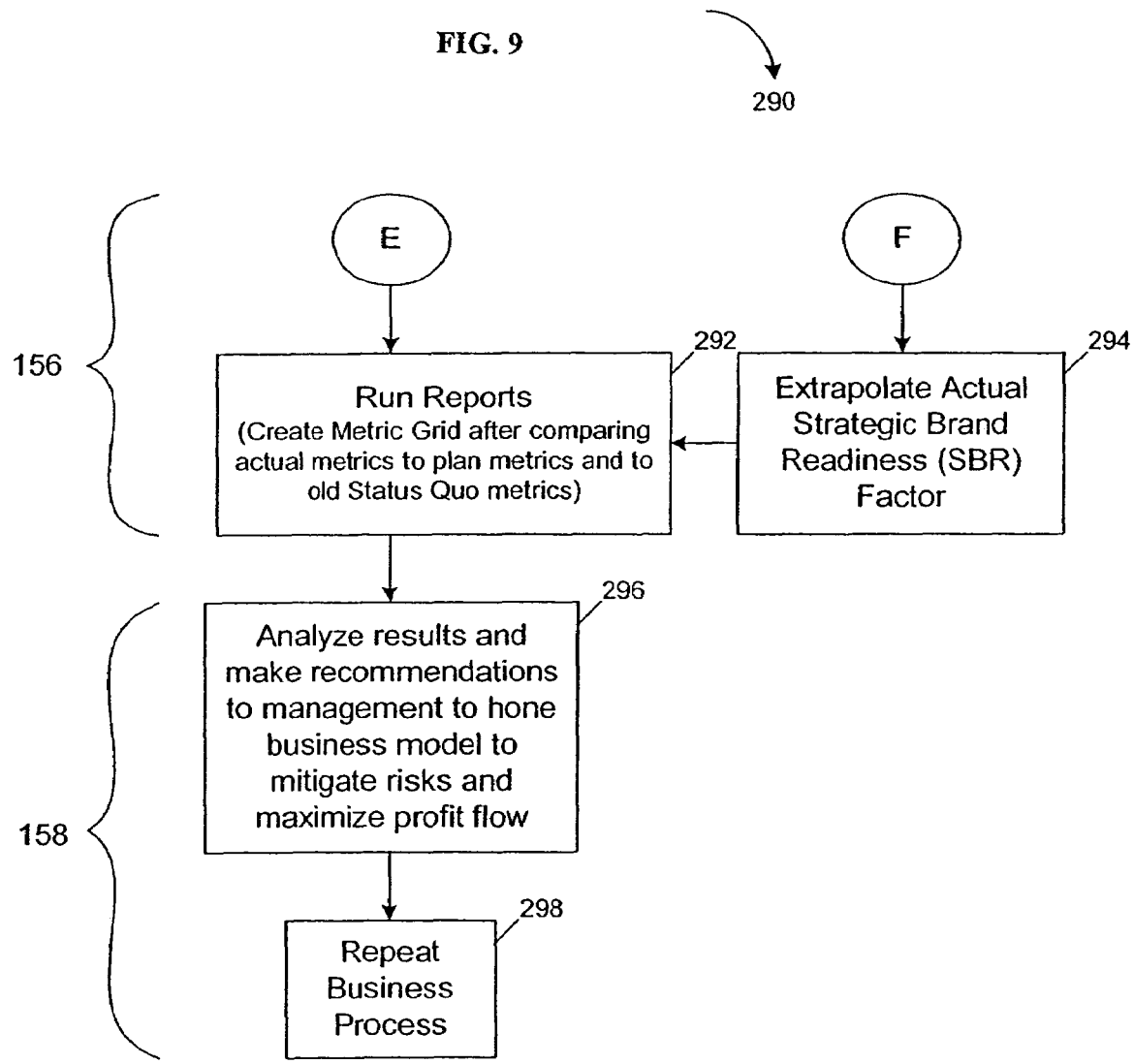
FIG. 9 is an exemplary embodiment of a flow chart detailing the steps of Establishing Leading Indicator Metrics and Documenting Benefits and Making Recommendations to management.

FIG. 9 is an exemplary embodiment of a flow chart 290 detailing Establishing 156 Leading Indicator Metrics and Documenting 158 Benefits and Making Recommendations to management. Leading Indicator Metrics are established 156 by running reports and comparing 292 actual metrics to plan metrics as well as status quo metrics. A new SBR factor is extrapolated 294. Benefits are documents 158 and Recommendations are made to management by analyzing 296 results and identifying recommendations to reduce risks and increase profits. The business process is repeated 298 to improve, reaching an increasingly more acceptable and effective solution.

Figure 10:
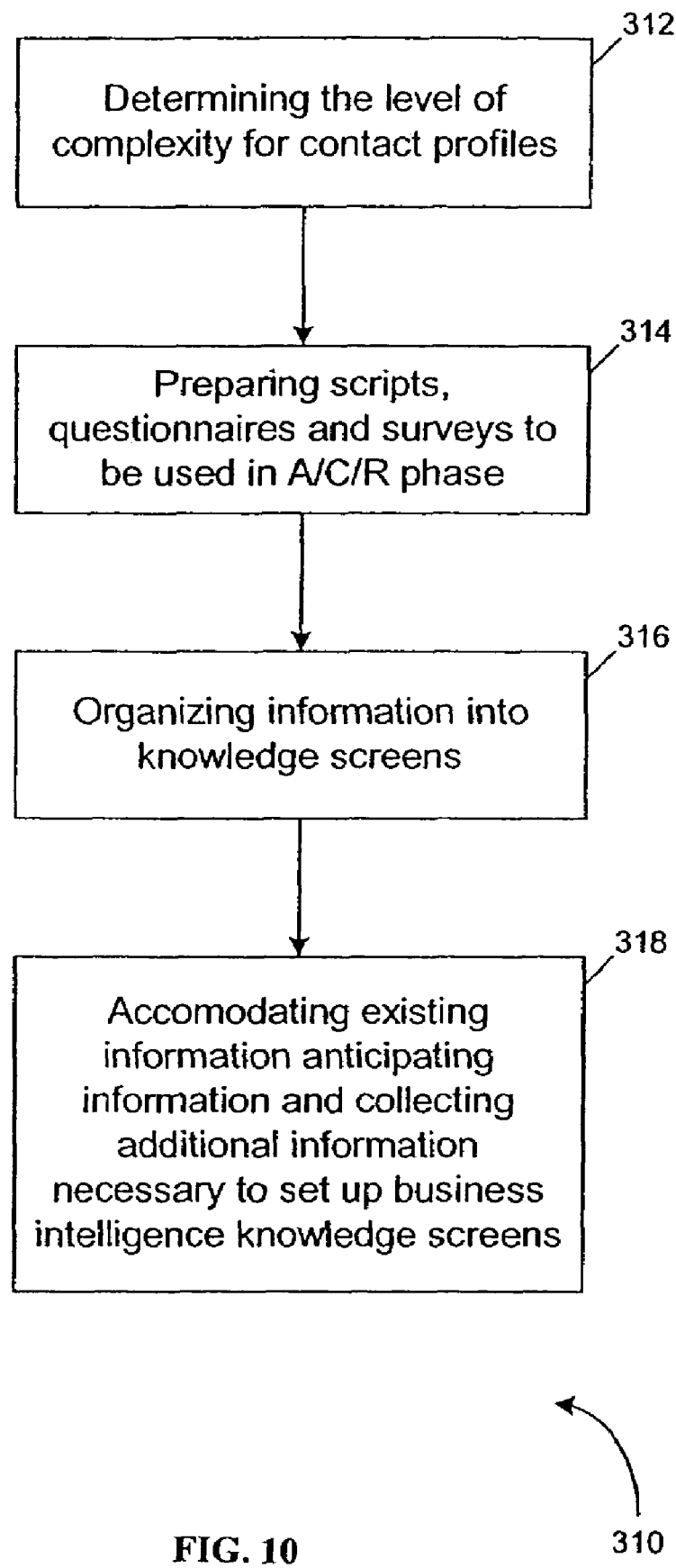
FIG. 10 is an exemplary embodiment of a flow chart depicting a process to build profiles.
Figure 62:
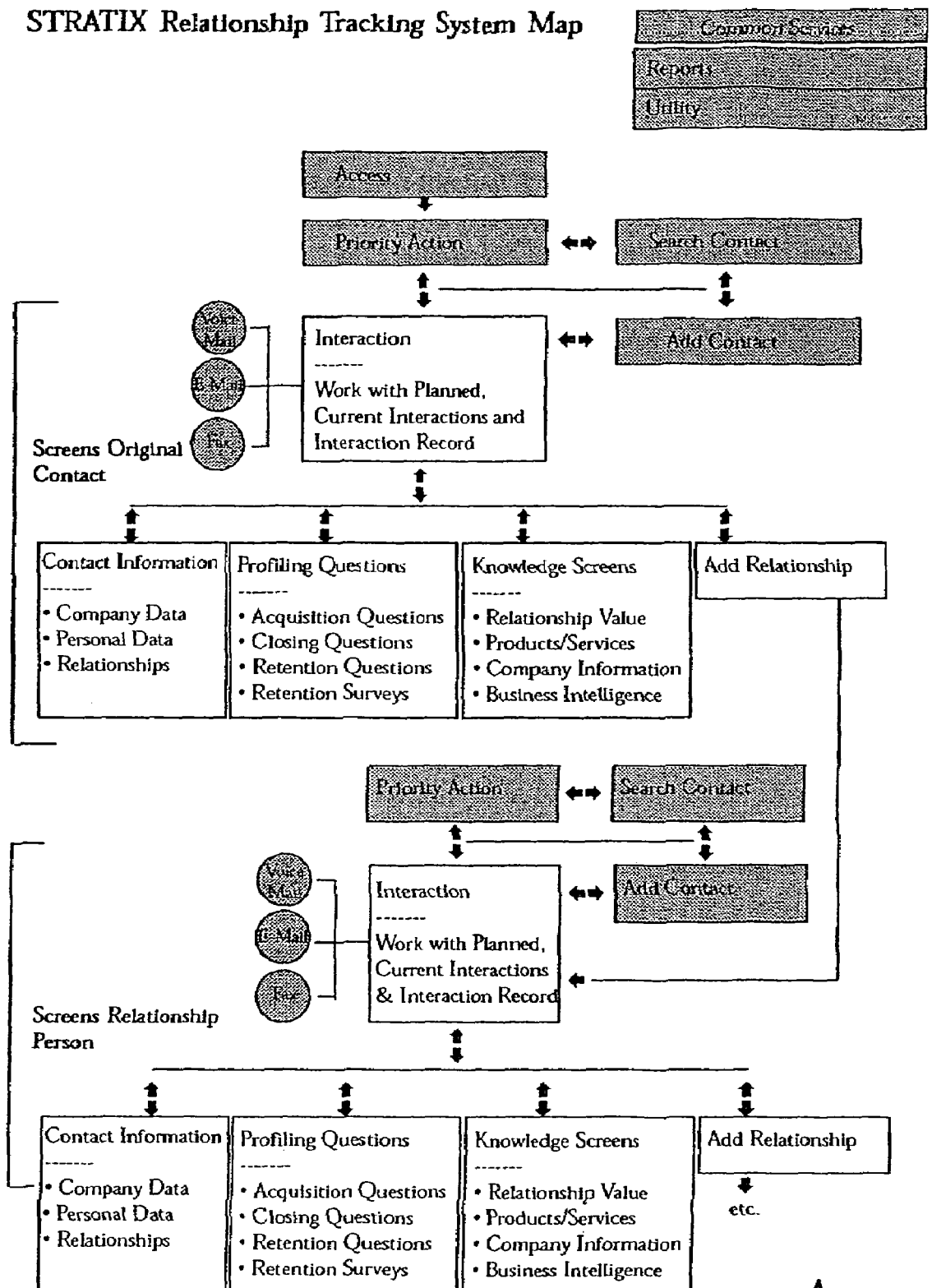
FIG. 62 is a flow chart providing an overview of the Relationship Tracking System from the perspective of the user.

FIGS. 10 through 62 describe one embodiment of MBS 10 (shown in FIG. 1) and explains how to track various data utilizing a database for accumulating information on individuals important to the success of the business entity. MBS 10 tracks deep contact information as well as an ongoing Interaction Record of various ways individuals within the business entity interact, how they react to various issues and interactions, how their behavior affects profitability by quantifying the effort and preparing reports. The information collected is sorted into several Knowledge screens preliminary to a formal analysis for deep profiling purposes. The Interaction Record itself is kept in tabular form (instead of the usual running dialogue of contact management systems) so it can be quickly reviewed and/or analyzed. Since MBS 10 is a network-based tool, everyone within the business entity can access the same records based on the authorization level granted by the management. These records are the same records used by telemarketers, if that part of the MBS function is outsourced to an outside marketing group.

Configuring the RT System as an Analytical Framework to Build Profiles, Track Results & Develop Leading Indicator Metrics Baselines:

For MBS 10 system to function effectively, MBS 10 is configured as an Analytical Framework by management personnel and a system administrator responsible for implementing the system. The configuration process includes configuring the relationship to build profiles and track results. The configuration process further includes establishing leading indicator metrics baselines.

a) Configuring the Relationships to Build Profiles

Building profiles starts with the definition of a targeted customer, such as a top priority customer. To build deep knowledge of the targeted customer, management attempts to obtain more than normal contact information. Screens to capture information about the contact's relationships and personal data as well as company data are created. Positions for potential answers to questions to be asked of contacts are organized in Knowledge screens. Information residing in the database is captured as initial information. The initial information flows into analysis formats, such as cross tabulation formats, multidimensional spreadsheets, or special database queries, and is used to generate reports useful for addressing management issues.

FIG. 10 is an exemplary embodiment of a flow chart 310 depicting a process of building profiles. To build profiles, information about the contact's relationships and personal data as well as the company data is obtained. Responses to questions asked to the contact are organized in Knowledge screens. Database information is appended as well. By appending results of existing and ongoing awareness and satisfaction market research to the data stored about the contact in database services, the database information can be used to predict how individuals (i.e. contacts) are likely to react which allows for more accurate forecasting.

First, a level of complexity for contact profiles is determined 312. This determination includes determining information available in databases and what is expected over time from the contact personally. The collected information is organized into Company Data, Personal Data and Relationship screens. Scripts, questionnaires, and surveys are prepared 314 for use in each Acquisition/Closing/Retention (A/C/R) Phase to elicit the information to be derived from the contact and/or to be verified by the contact. Information from the databases, the scripts, questionnaires and surveys is organized 316 into Knowledge screens including Relationship Value, Products/Services, Company Information and Business Intelligence. Existing information is accommodated 318, additional information is anticipated and collected to set up business intelligence Knowledge screens. In addition, a segment is set-up within database services to store the information relating to the Business Intelligence Knowledge screen. A link to awareness and satisfaction research results is established, either to match the customer segment of the contact or to reflect the individual's opinion. Links to a Web site may be included, as well as scanning and club card data, for example, on a customer segment or individual basis.

b) Configuring the Relationships to Collect Data, Track Results & Generate Reports Collecting Data includes collecting customer and prospective customer data as well as data pertaining to all contacts important to a business' success, such as partners, analysts, employees, referral sources, internal and external influences, and others.

Tracking Results includes tracking the entire customer relationship through Acquisition/Closing/Retention Phases, broken down into details of every Interaction with the contact and the responses recorded. In one embodiment, every Interaction is quantified by the relative value of the Interaction and by incremental cost and is added to the relationship profiles determined in FIG. 10.

Figure 11:
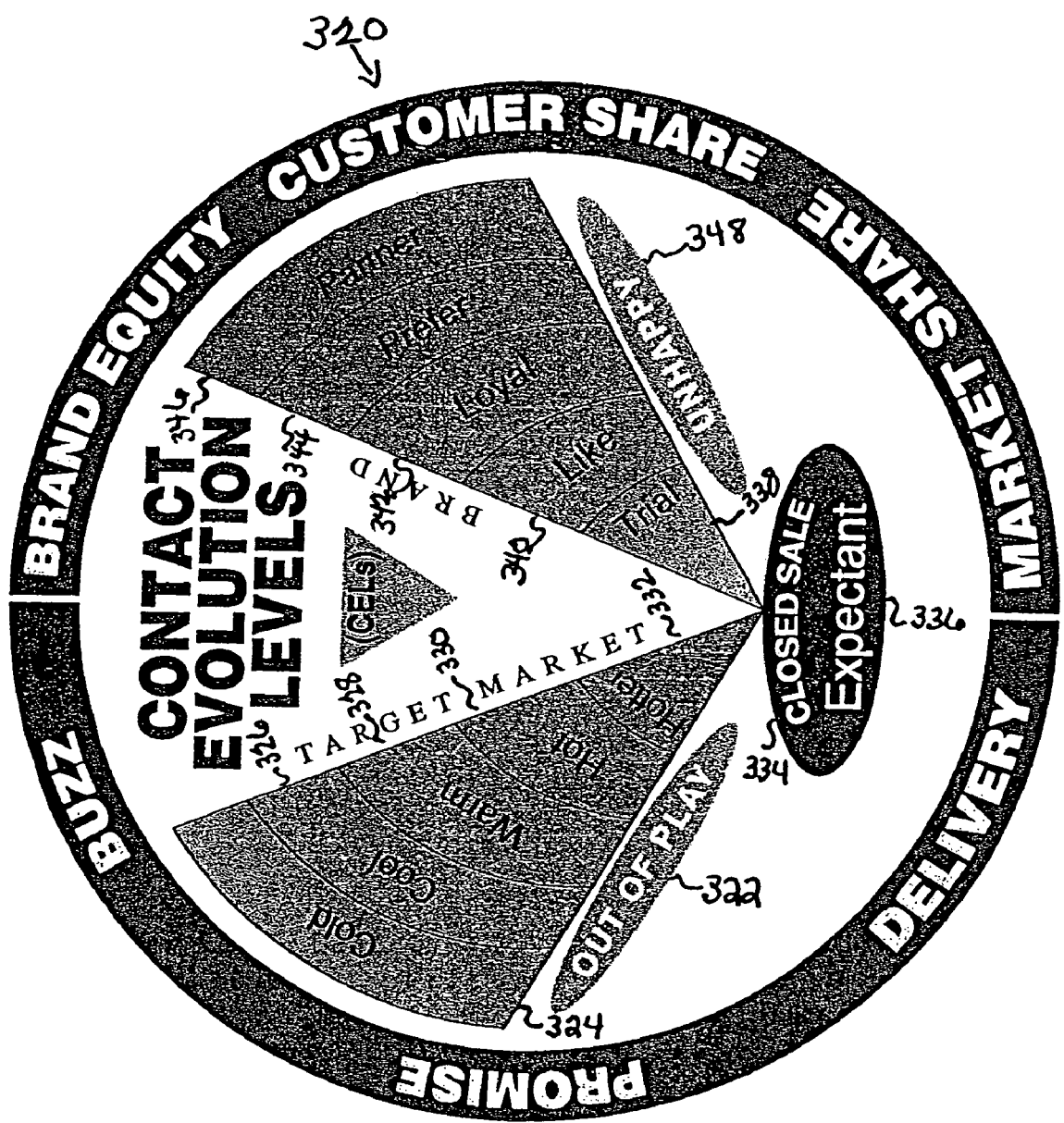
FIG. 11 illustrates a Contact Evolution Levels (CELs) visual chart showing the various contact levels.

FIG. 11 illustrates a Contact Evolution Levels (CELs) visual chart 320 showing the various contact levels. Each level is provided with a point value and each contact is provided with a number that includes a whole number followed by a decimal number. The decimal number indicates the amount of effort it has taken to move the contact within its present level to date. Chart 320 is a visual interpretation of how an Integrated Market Action Program (IMAP) through its Promise, Buzz and Delivery transforms a contact from someone in the Target Market who has never heard of the Company, or is Cold, into a customer who thinks of herself as a Partner of the Company and is helping the Company build its Brand. The more the contact is transformed and evolves through the Contact Evolution Levels or CELs, the more valuable the Brand and the greater the Brand Equity, Customer Share and Market Share for Company. These CEL levels also track with the Acquisition/Closing/Retention (A/C/R) Phases as described below in more detail.

The first CEL is Out of Play 322 which is given a point value of 0.0. Contacts at this level cannot be reached, refused permission to be marketed to, and/or has declined to be a customer any longer. The next three CELs form the Acquisition Phase and contacts in these CELs are termed Suspects. The first Acquisition CEL is Cold 324 which is given a point value of 1.0. Cold 324 contacts represent the target market and they are typically unexposed to current offerings. The next Acquisition CEL is Cool 326 which is given a point value of 2.0. Cool 326 contacts receive promotional materials and are generally more receptive to the company's offerings. The last Acquisition CEL is Warm 328 which is given a point value of 3.0. Warm 328 contacts agree to be placed on an email list and/or provides influencer names. They have also given their permission to be marketed to.

The next three CELs form the Closing Phase and contacts in these CELs are termed Prospects until the sale is closed. The first Closing CEL is Hot 330 which is given a value of 4.0. Hot 330 contacts agree to appointments since they generally would think about using the company's offering. The next Closing CEL is Hotter 332 which is given a point value of 5.0. Hotter contacts want a contract and they would like to acquire the company's offering. The final Closing CEL is Closed Sale 334 which is given a point value of 6.0. Closed contact 334 signs a contract for the company's offering.

The next six CELs form the Retention Phase and contacts in these CELs are termed customers. The first Retention CEL is Expectant Customer 336 which is given a point value of 7.0. Expectant Customers 336 are ready to receive offerings and the time frame is after hand over from sales to customer retention. The next Retention CEL is Trial 338 which is given a point value of 8.0. Trial 338 receive status reports and they are generally waiting to see what happens. The next Retention CEL is Likes 340 which is given a point value of 9.0. Likes 340 contacts do not complain and they accept the company's offering as it is. Contacts in Likes 340 CEL will not send the company's offering back to the company although this option may not be at the choice of the contact since they may either be locked in or have no other alternative. The next Retention CEL is Loyal 342 which is given a point value of 10.0. Loyal 342 contacts renew contracts and does so repeatedly. The next Retention CEL is Prefer 344 which is given a point value of 11.0. Prefer 344 contacts give references to the company and refer potential customers to the company. Prefer 344 contacts want to stay customers of the company and it would take an extreme situation to change their opinions. The next Retention CEL is Partner 346, which is given a point value of 12.0. Partner 346 contacts actively refer business to the company and under current conditions will pay a premium to have the company's offerings. In some instances, Partner 346 contacts even evangelizes with others and is an advocate of the company.

The final CEL is unhappy 348 which is given a point value of 13.0. Unhappy 348 contacts bad mouths the company and complains about the company. Contacts in this CEL are waiting for an opportunity to leave the company.

The CELs provide a convenient and effective method of tracking a contact through its evolution with the company and provides guidance with respect to how to target customers in each level. How the CELS are defined can be different for each business and are defined during an analysis of the Front Office Process (FIG. 6).

Figure 12:
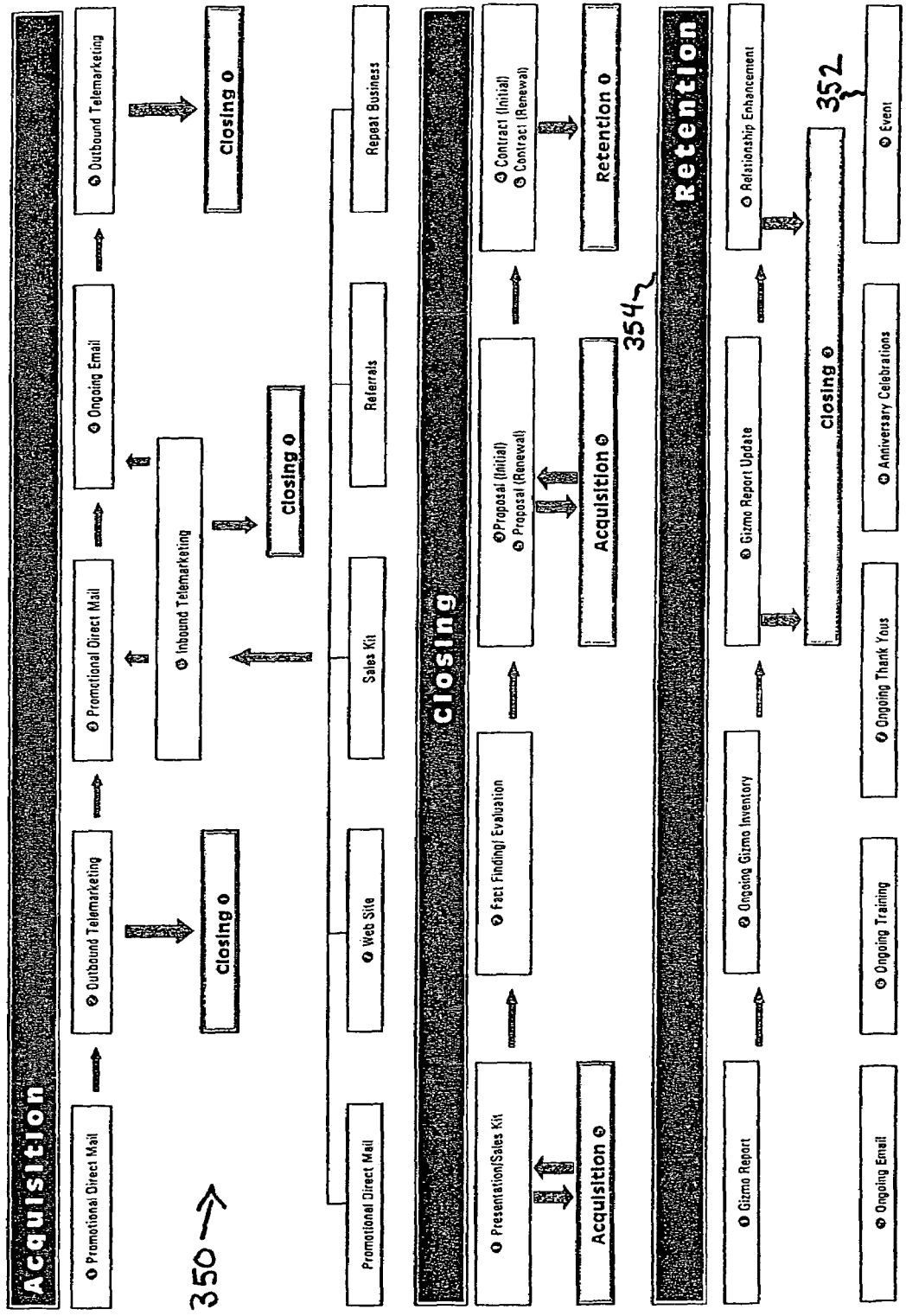
FIG. 12 is a tactics plan overview separated into Acquisition/Closing/Retention (A/C/R) Phases.

Another aspect of MBS 10 is a tactics plan overview 350 as illustrated in FIG. 12. Tactics plan overview 350 is separated into Acquisition/Closing/Retention (A/C/R) Phases. Within each A/C/R Phase how the planned tactics flow from one to another is drawn. Where the tactic might lead to another A/C/R Phase, it is indicated by an arrow drawn to a box listing the A/C/R Phase and the number of the tactic within that A/C/R Phase. (These numbers correspond to the Tactic Codes shown on the Interaction System (IS) Flow (see below).

As the interactions with a contact progresses, there can be numerous hand-offs between A/C/R Phases. Some tactics within an A/C/R Phase do not have a direct link to other tactics, but instead provide a baseline on Interactions with the contact, building the relationship and brand readiness.

The exemplary embodiment illustrated in FIG. 12 is for a company having one sales channel, one service offering, and one primary relationship. Ancillary programs for secondary relationships are shown as individual boxes. For example, Event Box 352 is Retention 354 is an Influencer Program. The business process can accommodate multiple channels, offerings and relationships by breaking up more complex situations into building blocks as illustrated. An appropriate tactics plan overview is created for every company, shaped by the marketing strategy it seeks to help implement.

FIG. 13 illustrates a tactics grid 360 that lists a number of tactics, which can be manifest in a variety of interactions. Where an "X" is placed in a column, the Promotional/Relationship Enhancement (P/RE) Tactics and Personal Interaction (PI) Tactics category is considered Fit or appropriate for that A/C/R Phase. Examples of how categories can be broken down includes breaking the Ongoing Thank You category into thank you notes, thank you email, thank you call, and others. Custom interactions include, in the exemplary embodiment, meetings, scheduling meetings, fact finding, conference calls, proposals, contract, and others. How the tactic categories are manifest can be different for each company.

FIG. 14 illustrates a Relative Interaction Value (RIV) Number Grid 370 to be used as a guide to set a value on all Interactions a business has with contacts to allow comparison of disparate Interactions. When all, or at least most, Interactions have a numeric value, the potential to improve the profitability through substitution of lower cost Interactions for higher cost Interactions exist, assuming the RIV number is comparable.

RIV Number Grid 370 builds on Tactics Grid 360 placing a maximum, common, numeric value on each Promotional/Relationship Enhancement (P/RE) and Personal Interaction (PI) Tactic category. Of all the Interactions the tactic category can be broken down into, no Interaction has a value higher than the maximum for the tactic category. Extraordinary events such as a customer referring someone else, offering a testimonial or expanding purchases are defined and valued uniquely for each company to arrive at a common RIV Number. The RIV number includes Relationship Enhancement (RE) and Importance (Impt.) characteristics in terms of the tactic category's probable effect on the contact.

RIV Number Grid 370 can be customized for a specific industry or company to reflect the different values their customers may place on Interactions or to add new Interactions. For example, in some industries a personal phone call is the only way to get a person's attention and in others only email will do. The process is most accurate if users are consistent once the values are assigned and use the same value in comparing Interactions from year to year. RIV Number Grid 370 utilizes averaging opinions of a panel of subject matter experts as a starting point for present values.

Figure 15:
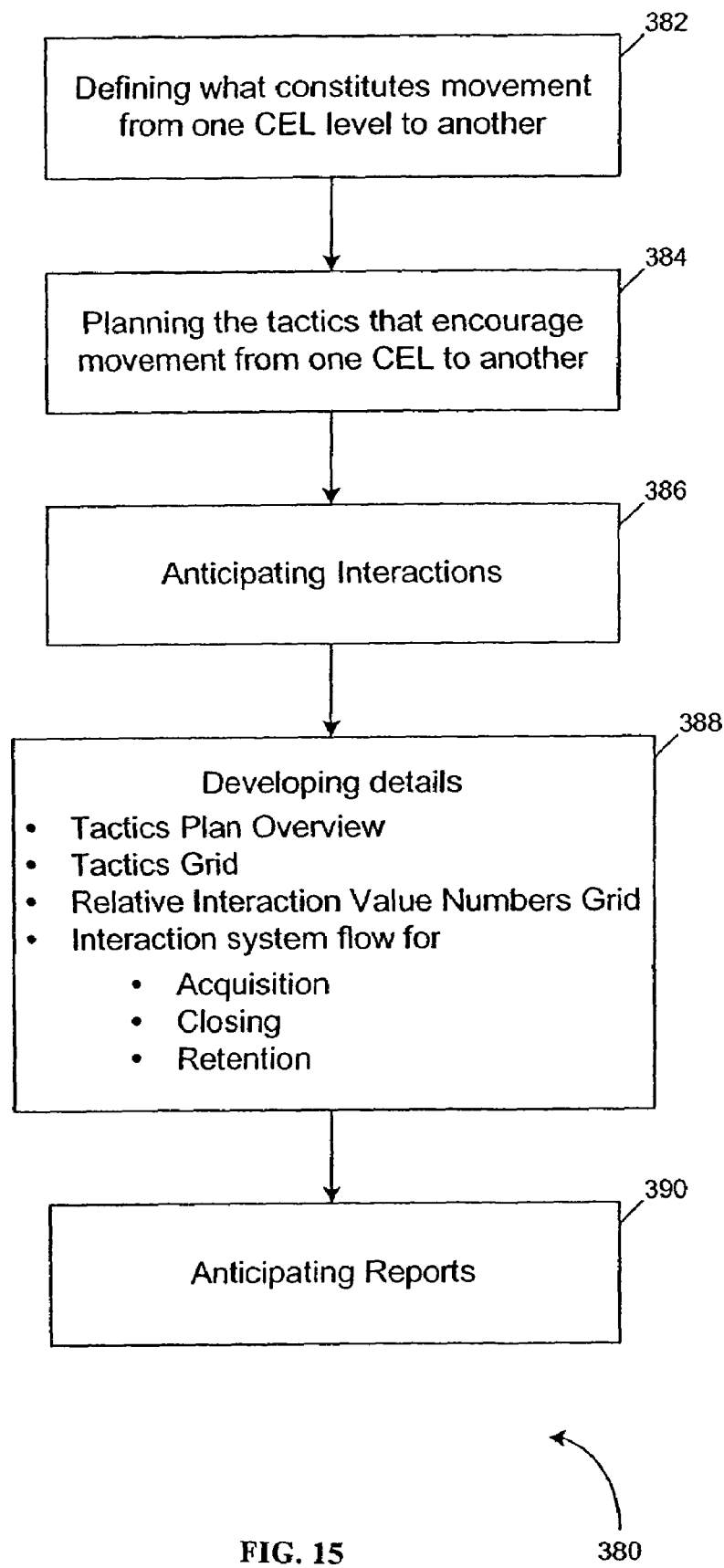
FIG. 15 is an exemplary embodiment of a flow chart depicting the process of configuring the system to collect data, track results and generate reports.

FIG. 15 is an exemplary embodiment of a flow chart 380 depicting a process of configuring MBS 10 to collect data, track results and generate reports. Initially, Management or a consultant designee defines 382 what constitutes movement from one CEL to another CEL. The A/C/R Phases and CELs are described above with respect to FIG. 11. Defining 382 what constitutes movement from one CEL to another also helps define roles in the Front Office. Next, management plans 384 the tactics that will encourage the movement from one CEL to another as illustrated in Tactics Plan Overview (shown in FIG. 12). A guide for the appropriate tactics to use in each CEL is encapsulated in Tactics Grid 360 (Shown in FIG. 13) which applies generally, although it can be customized for a company or industry. Planning 384 the tactics also helps integrate the Front Office and helps evaluate the profitability of alternative Marketing Strategies. After completion of planning 384 the tactics, management attempts to anticipate 386 Interactions and develop 388 details. Developing 388 details include outlining tactics that can be described in small interactions and the possible responses to these interactions. Tactics, description of each tactic, an assigned CEL Number, and an Incremental Costs associated with each tactic is outlined in an exemplary embodiment of an Interaction System (IS) Flow for the XYZ Company example (Appendix-B). Within the IS Flow, all the Interactions or responses are valued using Activity Based Costing techniques and a proprietary Relative Interaction Value (RIV) Number. RIV Number Grid 370 (shown in FIG. 14) sets a value on interactions a business has with contacts.

The flow from one Interaction to another is also valued by noting movement from one CEL to another when it occurs as defined in the first step. Anticipating 386 interactions helps confirm the profitability of the most desirable new Marketing Strategy and helps track the profitability in real time. In one embodiment, once the data is accumulated in database of MBS 10, every interaction and response with every contact throughout the entire relationship through A/C/R Phases is recorded in tabular form. By allowing the user to select from a list of preset Interactions and responses, MBS 10 transforms the business relationship and interactions into a quantifiable, standardized Interaction record that can be evaluated by the management.

In planning and anticipating 390 reports, management or a consultant designee anticipate the reports needed and label report formats in the RT System to match the detailed data to be collected in profiles including the Interaction Record.

Much effort is expended to anticipate the variety of ways that management will want to query the database to collect the appropriate data. The most likely ways that management will want to segment or aggregate data sets are included in a series of reports of formatted database queries, specifically Deposition of Contacts Summary Reports and Top Priority Customer Profile Reports (FIG. 61). Additionally, where it is believed that management will want to look at underlying data (Drill Down button), aggregate data sets (Merge button), or segment data sets (Slice 'N' Dice button) is anticipated and built into the Analytical Framework. This ability is enabled as appropriate with each report as illustrated in Appendix E. Any of these segmentation or aggregation sequences can be deployed before using one or more of the models described in Appendix D to focus the models on the top priority customers or other areas of interest to management.

c) Establishing Leading Indicator Metrics Baselines:

c1) A baseline for scoring the business's relative market position:

The Strategic Brand Readiness (SBR) Factor is used to score a business' relative market position and to quantify the risk created by external and internal brand readiness issues. The SBR Factor is then used in financial projections to modify the risk. In an exemplary embodiment, the SBR factor is computed for Status Quo, (FIG. 3) which reflects the current condition. The SBR factor is completed after a new marketing strategy is developed (FIG. 6) but before its implementation. In addition, the SBR factor is computed after the new marketing strategy has been implemented and in operation for at least a year.

To arrive at the SBR Factor, management assigns a score to the present condition of the business after analyzing twelve categories. The twelve categories include six External categories and six Internal categories, broken out by a Year One, a Year Two and a Year Three. The risks or benefits that are likely to occur or materialize in the next two years are also taken into consideration when the scores are assigned. The SBR factor process is again computed later on to determine the SBR Factor for the plan. The SBR factor for the plan is based on the New Marketing Strategy over a three-year period. Once the new marketing strategy has been implemented, an actual SBR Factor is computed (FIG. 9) which includes the actual results of the first year and the projected results for the two succeeding years. Appendix-C includes the SBR Factor calculation for the XYZ Company example utilized by management in developing the SBR factor for status quo and planned.

c2) A baseline for quantifying Front Office strategy and relationship performance:

The RT System is configured as an Analytical Framework to quantify Front Office strategy and relationship performance. The Analytical Framework compares past performance with anticipated future performance of strategy implementation in a Customer LifeCycle Profitability Model supplemented by an Interaction ROI Model. These models encompass the customers' entire life cycle and then track success in implementation against assumptions. The Analytical Framework also includes the ability to capture patterns of customer behavior precipitating an analysis of the cause and effect of relationships on profitability.

A series of management reports derived from the Analytical Framework yield leading indicator metrics that allow management to make more informed, focused adjustments to maximize profit and to be more effective in building relationships. These reports can be focused on the segmented or aggregated data sets of most interest to management.

In an exemplary embodiment, a Status Quo Customer Life-Cycle Profitability Model is run (FIG. 3), which reflects the current condition and what is likely to happen if nothing changes in the marketing program over the next three years. The model is built with Front Office and financial data as well as the appropriate SBR Factor. It anticipates the long-term profitability of the current marketing strategy, considering best and worst case scenarios and documents leading indicator metrics.

Later in the planning process, another series of models are run (FIG. 6) to anticipate the long-term profitability of alternative marketing strategies, looking at best and worst case scenarios and comparing anticipated results and metrics against the status quo model over the next three years. Once a most promising new marketing strategy is chosen, the Customer LifeCycle Profitability Model associated with it is double checked by looking at tactical requirements and assumptions in more detail (FIG. 7) in a Planning Mode Interaction ROI (I ROI). Adjustments are made in the new marketing strategy Customer LifeCycle Profitability Model as desired. The combination of the anticipated metrics in the Customer LifeCycle Profitability Model and I ROI Model form the baseline for future analysis of success in implementation.

Upon implementation, data from the tracking system feeds a Tracking Mode I ROI model (FIG. 8) which in turn flows to the Customer LifeCycle Profitability Model for comparison with what was anticipated in plan and the old status quo for year one. Adjustments are made to anticipate a new forecast for years two and three.

Appendix-D includes the status quo and alternative marketing strategies Customer LifeCycle Profitability Model for the XYZ Company example, summarized in a Customer Life-Cycle Profitability Model Alternative Strategies Comparison. In the example, Alternative #2, worst case scenario, will become the Planned Marketing Strategy and that strategy implementation example is used to illustrate the RT Tracking System in FIGS. 16-60.

Data from Tracking Mode I ROI model (FIG. 8) also feeds an analysis of customer behavior patterns, showing the cause and effect of customer relationships, Interaction by Interaction as well as the pattern punctuated by the major events or milestones in the customer life cycle. These behavior patterns when appended by Awareness/Satisfaction Research findings provides management with insight on what contacts and as well as groups of contacts are more likely to do, making the potential business intelligence more robust.

User Interfaces of the Marketing Business System (MBS):

FIGS. 16 through 60 are exemplary embodiments of user interfaces utilized by the MBS in the data collection and tracking process. Through a series of user interfaces, the user is guided to enter data and create a relationship structure within the system that builds profiles, tracks interactions, and other parameters important to managing the business. The information provided through the user interfaces depicted in FIGS. 16 through 60 is stored in centralized database services and retrieved as requested. Many variations of particular user interfaces or screens viewable by the user can be utilized. The following description using XYZ Company as an example refers to one set of screens that can be used to prompt the user to make the necessary inputs to enable the system to generate various reports, charts, or status reports. Of course, many variations of such screens are possible.

FIG. 16 is an exemplary embodiment of a user interface, also known as an Access page 392 of MBS 10 (shown in FIG. 1.) Access page 392 is displayed to allow the user to log onto the system. The system authenticates the user after verifying a user's identification name and a password. If the user is not authenticated, system 10 displays a message to the user advising the user to log in again. Access page 392 also downloads and displays two individual hypertext links entitled "Submit" which leads to the "Stratix Relationship Tracking System" 394 and "Stratix Systems" which leads to "Stratix Relationship Tracking System Map" 396.

In yet another embodiment, once a user has been authenticated, the user is directed to a customer center user interface (not shown). From the customer center user interface, the user selects Tracking System as the service the user wishes to access, which connects the user to the Tracking System Priority Action user interface 400 which serves as a home page shown in FIG. 17. It will be recognized by those skilled in the art that there are multiple other possible embodiments that can be utilized in securing the system as well as accessing the home page through the secured system.

FIG. 17 is an exemplary embodiment of a "Priority Action" user interface 400 which serves as the home page of the MBS. User interface 400 provides the user with an ability to view Planned Interactions 402 and Past Due Interactions 404. Priority Action user interface 400 is downloaded and displayed when the user has selected Tracking System hypertext link 394 (shown in FIG. 16) and provided appropriate authentication criteria to the system to validate the user's identity. User interface 400 displays an Interaction Date, a Type of the Interaction, a Name of a Contact, a Company Name, a Phone Number, and Contact Evolution Level (CEL) Number. There are two planned interactions, a first Interaction 406 and a second Interaction 408. First Interaction 406 refers to a Lily Corporation, while second Interaction 408 refers to a Fish Tail Company.

User interface 400 further displays "Go To" hypertext link. Selection of "Go To" hypertext link, takes the user directly to that specific interaction, wherein the user may enter or edit the data, as necessary. Additionally, Print, Help, List, Home, Back, Next, End and Top are some of the alternative buttons and hypertext links available to the user in using the system. In an exemplary embodiment, User interface 400 utilizes a side frame which utilizes seven different navigational buttons, tabs or hypertext links to guide the user through various sections. These sections include, but are not limited to, Interaction 410, Priority Action 412, Search Contact 414, Add Contact 416, Add Relationship 418, Reports 420, and Utility 422. These hypertext links or navigational buttons appear on every user interface allowing the user to access any specific user interface simply by selecting the specific navigational button from any given user interface.

FIG. 18 is an exemplary embodiment of an "Interaction" user interface 426 downloaded and displayed by MBS 10 when the user has selected Interaction 408 (shown in FIG. 17). The "Interaction" use interface serves as the control center for using MBS 10 with each contact. MBS 10 downloads and displays relevant information about the company as well as the contact person on user interface 426. User interface 426 further downloads Planned Interactions, Current Interactions, Notes, Next Interaction Information including date, and a complete Interaction Record to-date with Mr. Palm, the contact person at the FishTail Company. Interaction records include a User's Name, a Date the Interaction Occurred, a Type of the Interaction, Response Information, a CEL Number, and any pertinent Notes regarding this Interaction that may be relevant in concluding the business with this contact. Select Contact Information, Select Profiling Questions, and Select Knowledge Screening are some of the alternatives available to the user in moving from one screen to another. MBS 10 utilizes pull down menus to provide the user various options in selection of a specific category or a section. Voicemail, Email and FAX are alternative buttons and hypertext links added to aid the user in using the system.

FIG. 19 is a continuation of an "Interaction" user interface 430 downloaded and displayed by the MBS when the user has selected Interaction 408 (shown in FIG. 17). User interface 430 is a continuation of user interface 426 (shown in FIG. 18) and provides additional information relating to past interaction records with Fish Tail Company.

Figure 20:
FIG. 20 is a continuation of the "Interaction" user interface shown in FIGS. 18 and 19.

FIG. 20 is a continuation of an "Interaction" user interface 440 downloaded and displayed by the MBS when the user has selected Interaction 408 (shown in FIG. 17). User interface 440 is a continuation of user interface 430 (shown in FIG. 19).

FIG. 21 is an exemplary embodiment of a "Search Contact" user interface 460 downloaded and displayed by MBS 10 when the user has selected Search Contact 414 (shown in FIG. 17). The user may access this user interface by selecting the "Search Contact" hypertext link from any other user interface on which the Search Contact hypertext link is displayed. The user has several options to search information from database including but, not limited to, searching by a First Name, a last Name, a Company Name, a last Interaction Date, a Planned Interaction Date, a CEL #, or utilizing search filtered database or sorted database. The user may also utilize search screen by sorting database by selecting a first, a second or a third search parameter and selecting a sort button. After deciding and inputting the criteria, the user requests the system to search the database by selecting a Search button. MBS 10 downloads and displays relevant information based on the criteria submitted by the user. Through user interface 460, the user selects "Plants Unlimited" as a Company Name, a minimum and maximum Last Interaction Date and Planned Interaction Date, and selects the search button. Once the user has received relevant contact information from the database the user selects the contact desired and selects the Go To button.

FIG. 22 is an exemplary embodiment of an "Interaction" user interface 500 downloaded and displayed by MBS 10 when the user has selected "Plants Unlimited" as a Company Name, and selected the search button shown in user interface 460 (shown in FIG. 21) and then selected the contact name Herbert Ficus. MBS 10 downloads and displays relevant information about the Plants Unlimited as well as the contact person on user interface 500. User interface 500 further downloads Planned Interactions, Current Interactions, Notes, Next Interaction information including a date, and a complete Interaction Record to-date with Mr. Ficus, the contact person at the Plants Unlimited Company. Interaction records include a User's Name, a Date the Interaction Occurred, a Type of the Interaction, Response information, a CEL Number, and any pertinent Notes regarding this Interaction that may be relevant in concluding the business with this contact. Select Contact Information, Select Profiling Questions, and Select Knowledge Screening are some of the alternatives available to the user in moving from one screen to another. MBS 10 utilizes pull down menus to provide the user various options in selection of a specific category or a section.

FIG. 23 is a continuation of an "Interaction" user interface 510 downloaded and displayed by MBS 10 when the user has selected "Plants Unlimited" as a Company Name and selected the search button identified in user interface 460 (shown in FIG. 21). User interface 510 is a continuation of user interface 500 (shown in FIG. 22) and provides additional information relating to past interaction records with Plants Unlimited.

FIG. 24 is a continuation of an "Interaction" user interface 520 downloaded and displayed by the MBS when the user has selected Interaction 460 (shown in FIG. 21). User Interface 520 is a continuation of user interface 510 (shown in FIG. 23) and provides additional information relating to past interaction records with Plants Unlimited.

Figure 25:
FIG. 25 is a continuation of the "Interaction" user interfaces shown in FIGS. 22, 23, and 24.

FIG. 25 is a continuation of an "Interaction" user interface 530 downloaded and displayed by the MBS when the user has selected Interaction 460 (shown in FIG. 21). User interface 530 is a continuation of user interface 520 (shown in FIG. 24) and provides additional information relating to past interaction records with Plants Unlimited.

FIG. 26 is an exemplary embodiment of an "Interaction" user interface 560 downloaded and displayed by MBS 10 when the user has selected "Plants Unlimited" as a Company Name and selected the search button shown in user interface 460 (shown in FIG. 21). MBS 10 downloads and displays relevant information about the Plants Unlimited as well as the contact person on user interface 560. User interface 560 is identical to user interface 500 (shown in FIG. 22). This Planned Interaction is a follow-up to FIG. 22's Interactions. User interface 560 displays Planned Interactions, Current Interactions, Notes, Next Interaction Information including a date, and a complete Interaction Record to-date with Mr. Ficus, the contact person at the Plants Unlimited Company. Interaction records include a User's Name, a Date the Interaction Occurred, a Type of the Interaction, Response information, a CEL Number, and any pertinent Notes regarding this Interaction that may be relevant in concluding the business with this contact.

Through user interface 560, the user enters the information relating to a Current Interaction. In this exemplary embodiment, the user identified as "NPatel" has followed up with Mr. Herbert Ficus, the CEO of Plants Unlimited and has signed the contract to manage Gizmos—a service that is being sold by the user's company. The user further enters a Next Interaction Date and a Type of the Interaction planned with Plants Unlimited. The next interaction event identified as C4-8 relates to handing off the Plants Unlimited account responsibility to the Customer Care department, per the instructions given by Mr. Ficus.

FIG. 27 is a continuation of an "Interaction" user interface 590 downloaded and displayed by MBS 10 when the user has selected "Plants Unlimited" as a Company Name and selected the search button identified in user interface 460 (shown in FIG. 21). User interface 590 is a continuation of user interface 560 (shown in FIG. 26) providing additional information relating to past interaction records with Plants Unlimited.

FIG. 28 is a continuation of an "Interaction" user interface 580 downloaded and displayed by the MBS when the user has selected Interaction 460 (shown in FIG. 21). User interface 580 is a continuation of user interface 570 (shown in FIG. 27) and provides additional information relating to past interaction records with Plants Unlimited.

FIG. 29 is a continuation of an "Interaction" user interface 590 downloaded and displayed by the MBS when the user has selected Interaction 460 (shown in FIG. 21). User interface 590 is a continuation of user interface 580 (shown in FIG. 28) and provides additional information relating to past interaction records with Plants Unlimited.

Figure 30:
FIG. 30 is a continuation of the "Interaction" user interface shown in FIGS. 26, 27, 28, and 29.

FIG. 30 is a continuation of an "Interaction" user interface 600 downloaded and displayed by the MBS when the user has selected Interaction 460 (shown in FIG. 21). User interface 600 is a continuation of user interface 590 (shown in FIG. 29).

FIG. 31 is an exemplary embodiment of an "Interaction" user interface 620 when a user named "JKauke" selects a Planned Interaction option as a follow-up to FIG. 26's Interactions. User interface 620 displays Planned Interactions 622, Current Interactions 624, and Interaction Records 626. Current Interaction 624 relates to a first customer care follow-up required for client—Plants Unlimited. The user enters the information pertaining to the user's interaction. In this exemplary embodiment, the user, Mr. Kauke talked to Clarence, who promised the user that Clarence would get back to Mr. Kauke on a minor change to the contract. A Next Interaction event 628 and a Date 630 is also entered by the user—Mr. Kauke.

FIG. 32 is a continuation of an "Interaction" user interface 630 downloaded and displayed by the MBS 10. User interface 630 is a continuation of user interface 620 (shown in FIG. 31)

and provides additional information relating to past interaction records with Plants Unlimited. User interface 630 also displays the most recent interaction 632 by the previous user—Npatel, had with Mr. Ficus on the contract. It also reflects the brief summary 634 of the understanding reached between Mr. Ficus and the user on February 26th. Brief summary 634 is the same summary which was entered by the user—NPatel on February 26th through user interface 560 (shown in FIG. 26). Various different CEL Numbers 636 are reflected against each interaction based on the previously stored CEL numbers in database. These CEL Numbers are determined based on the predefined CEL Level definitions and a preset IS Flow that dictates what the CEL # values are for any Interaction as well as other strategic parameters relating to XYZ Company 638. CEL Numbers 636 are later used by MBS 10 in determining various management reports.

FIG. 33 is a continuation of an "Interaction" user interface 640 downloaded and displayed by MBS 10. User interface 640 is a continuation of user interface 630 (shown in FIG. 32) providing additional information relating to past interaction records with Plants Unlimited.

FIG. 34 is a continuation of an "Interaction" user interface 650 downloaded and displayed by the MBS 10. User interface 650 is a continuation of user interface 640 (shown in FIG. 33) and provides additional information relating to past interaction records with Plants Unlimited.

Figure 35:
FIG. 35 is a continuation of the "Interaction" user interface shown in FIGS. 31, 32, 33, and 34.

FIG. 35 is a continuation of an "Interaction" user interface 660 downloaded and displayed by the MBS 10. User interface 660 is a continuation of user interface 650 (shown in FIG. 34) and provides additional information relating to past interaction records with Plants Unlimited.

FIGS. 36 through 42 are exemplary embodiments of user interfaces facilitating inputs on various Contacts useful to the user in conducting the business.

FIG. 36 is an exemplary embodiment of "Add Contact" user interface 680 providing the user with an ability to add a new contact into database. Add Contact user interface 680 displays a blank Contacts page and allows the user to type in the information relating to that contact in the blank spaces. The information that the user inputs in blank contact page include, a Salutation, a Contact Name including First, Last and a Middle Name, a Title, a Company Name, a Company Address including a City Name, State, and Zip Code. System 10 further displays a Phone Number, an Extension, a Fax Number, a Cell Number, a Pager Number, Voicemail Number, Toll Free Number, an E-Mail address, a Secondary Email address, an URL address, a Toll Free Number, a Starting CEL Number, a Reference Number, and a Source of this Contact, Source Details and Customer Number.

FIG. 37 is an exemplary embodiment of a continuation of "Add Contact" user interface 730 providing the user with an ability to add additional information regarding the contact into the database.

FIG. 38 is an exemplary embodiment of "Contact Information Company Data" user interface 780 providing the user with an ability to add the contact's company data into the database. FIG. 38 follows the same format as FIG. 36.

FIG. 39 is an exemplary embodiment of a continuation of "Contact Information Company Data" user interface 800 providing the user with an ability to add additional information regarding the contact at the company into the database. FIG. 39 follows the same format as FIG. 37.

FIG. 40 is an exemplary embodiment of "Contact Information Personal Data" user interface 830 providing the user with an ability to add information on personal data relating to important contacts into the database. User interface 830 accumulates information such as person's hobbies, personal preferences, special interests, activities, culture, music preferences, etc. in addition to some basic personal contact information.

Figure 41:
FIG. 41 is a continuation of the "Contact Information Personal Data" user interface shown in FIG. 40.

FIG. 41 is an exemplary embodiment of a continuation of "Contact Information Personal Data" user interface 860 providing the user with an ability to add additional information on personal data relating to important contacts into the database.

FIG. 42 is an exemplary embodiment of "Contact Information Relationships" user interface 890 providing the user with an ability to add relationship information against each contact into the database. For example, the information that Mr. White is the Chairman and the boss of Mr. Ficus is added to the database. Similarly, Ms. Joy is the billing person contact and Mr. Orchid is the assistant to Mr. Ficus. Using this feature the user can subordinate others in the customer (or prospective customer) company to the primary contact.

FIG. 43 is an exemplary embodiment of "Voice Mail Script" user interface 900 providing the user with a script 902 that the user should use during the initial acquisition of a client. There are several versions of scripts 902 stored in the database and are retrieved by the user depending on each situation by selecting the voicemail button 904.

FIGS. 44 through 46 are exemplary embodiments of user interfaces documenting a First Outbound Telemarketing Script to be used during an acquisition phase of a client. An Outbound Telemarketing Script provides the user with a written script, which the user uses in actual conversation. When appropriate depending upon the individual responses from the contact, the user may use the FAX 1002 or Email 1004 buttons to facilitate the activity. A box is available against each question to record the response from the individual who is being targeted. The script further guides the user to move from one question to another based on the user's response. The data entered in each box is stored instantaneously in the database for future retrieval. The data recorded based on individual responses builds a strong profile in the database regarding the individual and the company he represents. The data is shown on the user interfaces in FIGS. 44 through 46 and as appropriate in the Knowledge Screens FIGS. 53 through 58. FIG. 44 is a first screen 1000 of the First Outbound Telemarketing Script user interface. FIG. 45 is a second screen 1010 of the First Outbound Telemarketing Script user interface. FIG. 46 is a third screen 1020 of the First Outbound Telemarketing Script user interface. Additional scripts are available by selecting Select Profiling Questions for a pull down menu, highlighting the selection and selecting the Submit button.

FIGS. 47 and 48 are exemplary embodiments of user interfaces documenting a list of Profiling Questions Closing Script to be used during a closing phase of a transaction. Profiling Questions Closing Script provides the user with a written script, which the user uses in actual conversation. To print the questions to take on an appointment, the user selects the Print 1032 button. A box is available against each question to record the response from the individual who is being profiled relating to the experiences during the closing phase as well as the overall experience so far. The data accumulated focuses on potential contract situation with XYZ Company, and other relevant information about the company that may help facilitate in generating additional revenues. The script further guides the user to move from one question to another based on the user's response. The data entered in each box is stored instantaneously in the database for future retrieval. The data recorded based on individual responses builds a strong profile in the database regarding the individual and the company he represents. The data is shown on the user interface in FIGS. 47 and 48 and as appropriate in the Knowledge screens FIGS. 53 through 58. FIG. 47 is a first screen 1030 of the Profiling Questions Closing Telemarketing Script user interface. FIG. 48 is a second screen 1040 of the Profiling Questions Closing Telemarketing Script user interface.

FIGS. 49 and 50 are exemplary embodiments of a user interface 1050 documenting a list of Profiling Questions Retention Script to be used during a retention phase of a transaction. Profiling Questions Retention Script user interface 1050 provides the user with a written script of questions, which the user utilizes in actual conversation. A box is available against each question to record the response from the individual who is being profiled relating to the experiences during the retention phase as well as the overall experience so far. The data accumulated focuses on service performance of XYZ Company, and other relevant information about the contact company that may help facilitate in generating additional revenues and retaining the customer. The script further guides the user to move from one question to another based on the user's response. The data entered in each box is stored instantaneously in the database for future retrieval. The data recorded based on individual responses builds a strong profile in the database regarding the individual and the company he represents. The data is shown on the user interface in FIG. 49 and as appropriate in the Knowledge Screens FIGS. 53 through 58. FIG. 49 is a first screen 1050 of the Profiling Questions Retention Script user interface. FIG. 50 is a second screen 1060 of the Profiling Questions Retention Script user interface.

FIGS. 51 and 52 are exemplary embodiments of user interfaces documenting a list of Profiling Questions Retention Survey Script to be used during a first retention survey after the transaction has been closed and the customer had some initial experience with the XYZ company, service and personnel. Profiling questions Retention Survey Script provides the user with a written script, which the user uses in actual conversation. Profiling Questions focus on Customer Satisfaction, Industry Trend and Targeting Information. A box is available against each question to record the response from the individual who is being profiled relating to the experiences during the retention phase as well as overall experience so far. The data accumulated focuses on service performance of XYZ Company, and other relevant information about the company that may help facilitate in generating additional revenues and retaining the customer. The script further guides the user to move from one question to another based on the user's response. The data entered in each box is stored instantaneously in the database for future retrieval. The data recorded based on individual responses builds a strong profile in the database regarding the individual and the company he represents. The data also helps management evaluate the CEL Level of the individual based on their answers. Survey #1 attempts to determine if the contact has moved past Expectant or Trial Levels. FIG. 51 is a first screen 1070 of the Profiling Questions Retention Survey #1 user interface. FIG. 52 is a second screen 1080 of the Profiling Questions Retention Survey #1 user interface. Additional scripts are available by selecting Select Profiling Questions for a pull down menu, highlighting the selection and selecting the Submit button.

FIGS. 53 through 60 are exemplary embodiments of Knowledge Screens user interfaces providing useful information to the user based on the information accumulated by the system. The information in the Knowledge Screens can come from purchased lists, company historical records, direct responses from the contacts, appended research data, and others.

FIG. 53 is an exemplary embodiment of a Relationship Value Screen user interface 1090 providing the user with an ability to obtain and add additional information regarding the relationship the user has with Plants Unlimited. Relationship Value Screen user interfaces 1090 summaries the method by which a business assigns value to its relationship with a contact from simple ratings like priority for closing the sale or increasing revenue to the contact's influence 1092 in terms of referrals and references and beyond. More sophisticated valuations of Customer Lifetime Value (CLV) 1094 are compared to the contact's Net Contribution to the business with the difference guiding management in its treatment of the contact. Additionally, a value could be placed on the testimonials, referrals and references or other ways contacts use their influence to help. This value could then augment the Net Contribution to the business to give a more accurate picture of the value of the contact to the business.

FIG. 54 is a continuation user interface 1100 of the Relationship Value Screen user interface providing additional details 1104 on CEL Level movement, Interactions and cost. An Individual Interaction ROI (I ROI) Report 1182 on the individual contact provides management an overview of the individual contact's history of CEL Level movement, Interactions and cost. The aggregate of this datastream from all contacts in the database provides the basis for a key report from MBS 20, the Interaction ROI (I ROI) Models Report, which captures patterns of customer behavior.

FIG. 55 is an exemplary embodiment of a Products/Services user interface 1110 providing the user information on Products and Services that are being purchased by the customer—Plants Unlimited. It focuses on a number of units to be managed, a start date of the contract, a yearly revenue anticipated from this contract, monthly revenue, a length of the contract and other pertinent details summarizing the current relationship between the XYZ Company and Plants Unlimited.

FIG. 56 is an exemplary embodiment of a Company Information user interface 1120 providing the user with an ability to obtain the business information about Plants Unlimited. User interface 1120 summarizes information about Plants Unlimited. The information includes, but not limited to, a Size of the company, a SIC code, an Industry type, a Type of the Business, Year ending information, Years in Business, Credit Rating and other pertinent information about the company.

FIG. 57 is an exemplary embodiment of a Business Intelligence user interface 1130 providing the user with Plants Unlimited business intelligence information. Business Intelligence user interface 1130 summarizes what has been learned about the contact from a variety of research avenues-internal as well as external sources. By appending results of existing and ongoing awareness and satisfaction market research to the contact record, the results can be correlated with the expected behavior or predictability of people to improve forecasting accuracy.

Figure 58:
FIG. 58 is a continuation of the user interface of the "Business Intelligence Knowledge Screen" user interface shown in FIG. 57.

FIG. 58 is a continuation user interface 1140 of the Business Intelligence user interface providing a key report. An Individual Correlation with Awareness/Satisfaction Research 1142 provides management with insight on what the contact is likely to do. The aggregate of this data stream from all contacts in the database provides the basis for another key report from the MBS 10, the Correlation with Awareness/Satisfaction Research Model Report, which appends data to a customer behavior pattern making the potential business intelligence more robust.

Through the Acquisition and Closing Phases, the movement to another CEL Level can be defined by what people (or contacts) do and that can be correlated to what they say in awareness and satisfaction research. In Retention, however, movement from one CEL Level to another is defined by customers in surveys with Front Office staff and corroborated by supplemental tracking research. It is where they say they are, correlated to what they do. This correlation is very important. Unless tracked, it is difficult to interpret what people say in satisfaction interviews into meaningful predictions of future behavior. By correlating what people do with what they say, awareness and satisfaction becomes much more powerful.

FIG. 59 is an exemplary embodiment of an Add Relationship user interface 1150 providing the user with an ability to add relationship information for a specific contact name that was acquired during the discussion with the CEO of Plants Unlimited. FIG. 59 follows the same format as FIGS. 36 and 38.

FIG. 60 is a continuation user interface 1160 of the Add Relationship user interface allowing the user additional information such as an alternative address and a name of the delivery team involved in the transaction. FIG. 60 follows the same format as FIGS. 37 and 39.

FIG. 61 is an exemplary embodiment of a Reports user interface 1300 providing the user with an ability to print various management reports. User interface 1300 lists the names of various management reports and provides hypertext links to access these reports. In an exemplary embodiment, the input templates used by and the reports generated by MBS 10 include, but are not limited to:

Input Templates:
    Strategic Brand Readiness (SBR) Factor Template

Customer LifeCycle Profitability Model Template

Interaction ROI (I ROI) Template

Reports:

Strategic Brand Readiness (SBR) Summary Report

Customer LifeCycle Profitability Alternative Strategies Comparison

Customer LifeCycle Profitability Summary Report

Interaction ROI (I ROI) Summary Reports
    Phase Level Process
    Phase Level Events
    CEL Level Process
    CEL Level Events Individual Interaction ROI (I ROI) Report Interaction ROI (I ROT) Model Report Individual Correlation with Awareness/Satisfaction Research Correlation with Awareness/Satisfaction Research Model Report Deposition of Contacts Summary Reports
    By Phase Level
    By Status
    By Origination Top Priority Customers Profile Reports
    Characteristics
    Attributes MBS 10 generates a wide variety of management reports. Exemplary embodiments of some of these reports with brief explanations on how the reports can be used by management in mitigating risk and maximizing profit flows are included in Appendix-E. In addition, a report grid that summarizes the use, purpose and benefit of the templates and reports is included in Appendix E. Further Appendix E includes an example that pertains to a company (XYZ Company) and its use of the MBS.

FIG. 62 is a flow chart 1500 providing an overview of the road map from the perspective of the user. Flow chart 1500 is downloaded and displayed by server system when the user selects a hypertext link entitled "Stratix Relationship Tracking System Map" 396 (shown in FIG. 16). Flow chart 1500 is the pictorial representation of the user steps and the possible options available to the user.

While the invention has been described in terms of various specific embodiments, those skilled in the art will recognize that the invention can be practiced with modification within the spirit and scope of the claims.

What is claimed is:

1. A method for managing marketing using a network-based marketing business system including a server coupled to a centralized interactive database and at least one client system in order to measure and manage a development of a relationship between a business and a contact, said method comprising:

creating, using the server, a unifying framework to manage contact Acquisition, Closing, and Retention as a continuum;

creating using the server, consistent contact relationship metrics across the unifying framework to measure progress in relationship development;

establishing, using the server, a deliberate, systematic process using the unifying framework and metrics to develop relationships and execute strategy, wherein the framework, metrics and process are stored in the database on the server; creating and storing, using the server, a plurality of contact relationship levels representative of a customer lifecycle for the framework within the database, wherein each contact relationship level is assigned to at least one of a plurality of marketing phases including Acquisition, Closing and Retention;

anticipating in advance and populating, using the server, the database with a plurality of potential interactions between the business and the contact necessary within each contact relationship level to execute a predetermined strategy to develop the relationship between the business and the contact;

predefining, using the server, and storing in the database at least one trigger interaction within the plurality of potential interactions that enables movement of the contact from a first contact relationship level of the plurality of contact relationship levels to a second relationship level of the plurality of relationship levels and from a first marketing phase to a second marketing phase;

assigning, using the server, and storing in the database a predetermined relative interaction value based on an anticipated relative impact and relationship enhancement capabilities of each of the plurality of potential interactions between the business and the contact, the relative interaction value serving as a basis of measuring interaction effectiveness and progress in developing the relationship between the business and the contact;

assigning, using the server, and storing in the database a predetermined variable cost to each of the plurality of potential interactions between the business and the contact;

measuring, using the server, progress in relationship development for the contact within each contact relationship level by receiving over a network and recording the consistent contact relationship metrics of interactions, relative interaction value, and interaction variable cost associated with each actual interaction between the business and the contact in an ongoing interaction record stored in the database on the server, wherein each actual interaction has an associated relative interaction value and variable cost;

continually assigning, using the server, the contact to a contact relationship level of the plurality of contact relationship levels as each actual interaction is recorded in the database on the server such that the assigned contact relationship level remains the same until the predefined definition of the at least one trigger interaction required for movement of the contact between contact relationship levels occurs;

continually updating in the database on the server a cumulative relative interaction value and cumulative variable interaction cost for the contact as each actual interaction occurs within the assigned contact relationship level based on the relative interaction value and variable cost associated with each actual interaction;

developing, using the server, an operational data stream in the database on the server for the contact, wherein the data stream tracks a cause and effect relationship between the recorded actual interactions and the corresponding relative interaction value of each recorded actual interaction and tracks the variable cost of each recorded actual interaction;

running, using the server, a computer-generated summary report for the contact, the summary report based on the data stream for the contact and transmitted by the server for display on said at least one client system, wherein the report includes operational interaction flow summaries and patterns;

based on the report, making real-time day-to-day decisions and process improvements regarding the profitability and effectiveness of the chosen strategy and analyzing and producing long-term planning of the profitability and effectiveness of alternative marketing strategies by aggregating and correlating the operational interaction flow summaries and patterns with data acquired from other decision support systems and transaction processing systems.

2. A method in accordance with claim 1 further comprising modeling alternative strategies in advance of investment, wherein modeling alternative strategies comprises:

anticipating, using the server, potential interactions, fixed costs associated with each potential interaction, and variable costs associated with each potential interaction, the potential interactions being necessary to carry out the alternative strategies through each of the plurality of marketing phases;

running reports, using the server, for each alternative strategy based on status quo, best case scenario, and worst case scenario;

selecting, using the server, a best new planned strategy;

configuring, using the server, an operational relationship tracking system by populating the database with the anticipated potential interactions necessary to carry out an implementation of the selected best new planned strategy as a continuum through the plurality of marketing phases and through the plurality of contact relationship levels within each marketing phase such that all potential interactions and the associated relative interaction values and variable costs of each interaction are available to be selected by the operator of the system for the interaction record when the system is operational;

linking planning to operational execution, using the server, by systematically tracking actual results in executing the selected best new planned strategy by receiving over the network and recording in the database on the server consistent contact relationship metrics within the framework in an ongoing interaction record, wherein each actual interaction has an associated relative interaction value and variable cost and wherein the interactions, the relative interaction values, and the variable costs each constitute a data stream of contact relationship metrics; and updating strategy decision models, using the server, with actual operational variable cost data from a computer-generated summary report to replace estimates.

3. A method in accordance with claim 1 further comprising, cross-referencing, using the server, the received contact profile information against a unique identifier for easy retrieval and update in the database on the server, wherein the contact information includes the ongoing interaction record.

4. A method in accordance with claim 1 further comprising running computer-generated reports, using the server, and displaying the reports on the at least one client system that help management improve upon a marketing strategy to reduce risk and maximize profits by linking planning to operational execution by systematically tracking actual results in executing best new planned strategy.

5. A method in accordance with claim 1 further comprising running, using the server, a computer-generated detailed history of past interactions, current interactions, and planned interactions.

6. A method in accordance with claim 1, wherein recording each actual interaction between the business and the contact comprises receiving over the network and automatically recording each actual interaction in the ongoing interaction record in real time in the database on the server, wherein each actual interaction is initiated by at least one of the business, a contact of the plurality of contacts, and an automatic computer-generated trigger based on one of a previous actual interaction and an integrated market action plan.

7. A method in accordance with claim 1, wherein assigning the contact to a contact relationship level of the plurality of contact relationship levels as each actual interaction is received over the network and recorded comprises assigning the contact to a contact relationship level based on which potential interactions of the plurality of potential interactions keep the contact assigned to the same contact relationship level and which of at least one trigger interaction are predetermined to be necessary to move the contact from the first contact relationship level of the plurality of contact relationship levels to the second relationship level of the plurality of contact relationship levels and from a first marketing phase to a second marketing phase.

8. A method in accordance with claim 1 further comprising aggregating in the database on the server, as part of a data stream for a particular contact, each actual interaction between the business and the particular contact to determine an interaction flow between the business and the particular contact within each contact relationship level of the plurality of contact relationship levels and within the at least one marketing phase, wherein the data stream for the particular contact includes a relative interaction value of each actual interaction between the business and the particular contact and a variable cost of each actual interaction between the business and the particular contact.

9. A method in accordance with claim 8 further comprising aggregating the data stream in the database on the server associated with the contact into the data stream of all contacts of a plurality of contacts to determine an interaction flow between the business and the plurality of contacts within each contact relationship level of the plurality of contact relationship levels and within the at least one marketing phase.

10. A method in accordance with claim 9 further comprising running a computer-generated summary report for the plurality of contacts, the summary report based on the aggregate data stream of the plurality of contacts, and displaying the summary report on the at least one client system.

11. A method in accordance with claim 10 further comprising comparing the data stream for each contact of the plurality of contacts and the computer-generated summary report generated for each contact to the aggregate data stream of the plurality of contacts and the computer-generated summary report generated for the plurality of contacts to facilitate guiding decisions and process improvements relating to relationship development between the business and each contact of the plurality of contacts in real time.

12. A method in accordance with claim 9 further comprising:
   determining a computer-generated aggregate relative interaction value for the plurality of contacts; and
   correlating the aggregate relative interaction value with at least one of business profits, customer satisfaction, and other key performance indicators of the business, wherein the aggregate relative interaction value is a leading indicator of business profits, customer satisfaction and other key performance indicators of the business.

13. A method in accordance with claim 9 further comprising:
   using a computer-generated aggregated data stream to facilitate iterative improvement of business performance; and
   adjusting predetermined relative interaction values to reflect new values suggested from results obtained from a relationship tracking system.

* * * * *